United States Patent
Alsindi et al.

(10) Patent No.: US 9,945,953 B2
(45) Date of Patent: Apr. 17, 2018

(54) METHODS AND DEVICES FOR BIAS ESTIMATION AND CORRECTION

(71) Applicants: Khalifa University of Science, Technology, and Research, Abu Dhabi (AE); British Telecommunications plc, London (GB); Emirates Telecommunications Corporation, Abu Dhabi (AE)

(72) Inventors: Nayef Alsindi, Abu Dhabi (AE); James Aweya, Abu Dhabi (AE); Zdenek Chaloupka, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 453 days.

(21) Appl. No.: 14/477,191

(22) Filed: Sep. 4, 2014

(65) Prior Publication Data
US 2016/0069676 A1    Mar. 10, 2016

(51) Int. Cl.
*G06F 19/00*     (2018.01)
*G01S 19/00*     (2010.01)
(Continued)

(52) U.S. Cl.
CPC ............ *G01S 19/00* (2013.01); *G01S 5/0215* (2013.01); *G01S 19/22* (2013.01)

(58) Field of Classification Search
CPC ...... H04W 4/028; H04W 4/023; G01S 5/0294
(Continued)

(56) References Cited

U.S. PATENT DOCUMENTS

| 7,065,368 B2 | 6/2006 | You et al. |
| 2003/0098811 A1 | 5/2003 | Nikolai et al. |

(Continued)

FOREIGN PATENT DOCUMENTS

| JP | 2011058928 A | 3/2011 |
| WO | 9814018 | 4/1998 |

OTHER PUBLICATIONS

International Search Report, PCT/GB2014/052673, International filing date Sep. 4, 2014.
(Continued)

*Primary Examiner* — Edward Raymond
(74) *Attorney, Agent, or Firm* — Calfee, Halter & Griswold LLP

(57) ABSTRACT

This invention relates to methods and devices for bias estimation and correction, particularly for time-of-arrival (TOA) based wireless geolocation systems. Multipath and non-line-of-sight (NLOS) biases can cause distance estimation errors in the range of tens-hundreds of meters and is particularly problematic in urban and indoor environments. The behavior of the biases dynamically changes depending on the clutter and/or obstructions between the base station and the mobile device. Aspects of the present invention provide practical real-time bias estimation and correction techniques for TOA-based systems and are based on inferring and estimating the biases from dynamic time differential measurements. The techniques can operate in real-time and involve simple calculations.

32 Claims, 24 Drawing Sheets

(51) Int. Cl.
*G01S 19/22* (2010.01)
*G01S 5/02* (2010.01)

(58) Field of Classification Search
USPC .......................... 702/94, 150, 161, 182–185
See application file for complete search history.

(56) References Cited

U.S. PATENT DOCUMENTS

| 2013/0029685 | A1* | 1/2013 | Moshfeghi | G01S 19/48 |
| | | | | 455/456.1 |
| 2016/0127871 | A1* | 5/2016 | Smith | H04W 4/025 |
| | | | | 455/456.6 |
| 2017/0041750 | A1* | 2/2017 | Jose | G01S 5/0263 |

OTHER PUBLICATIONS

I. Guvenc and C.-C. Chong, "A survey on TOA based wireless localization and NLOS mitigation techniques," IEEE Commun. Surveys and Tutorials, vol. 11, No. 3, pp. 107-124, 3rd Quarter 2009.
M. Najar, J. M. Huerta, J. Vidal and J. A. Castro, "Mobile location with bias tracking in non-line-of-sight" in Proc. IEEE Int'l Conf. on Acoustic, Speech and Signal Processing, vol. 3, pp. 956-959, May 2004.
S. Mazuelas, F.A. Lago, J. Blas, A. Bahillo, P. Fernandez, R.M. Lorenzo and E. J. Abril, "Prior NLOS measurement correction for positioning in cellular wireless networks", IEEE Trans. on Vehicular Technology, vol. 58, No. 5, pp. 2585-2591, Jun. 2009.
J. Youssef, B. Denis, C. Godin and S. Lesecq, "Enhanced UWB indoor tracking through NLOS TOA biases estimation," in Proc. IEEE Global Telecommunications Conference (GLOBECOMM), pp. 1-5, Dec. 2008.
K. Yu, "Improved kalman filtering algorithms for mobile tracking in NLOS scenarios", in Proc. IEEE Wireless Commun. and Net. Conf. (WCNC), pp. 2390-2394, Apr. 2012.
W. Ke and L. Wu, "Mobile location with NLOS identification and mitigation based on modified Kalman filtering", Sensors, vol. 11, pp. 1641-1656, 2011.
H. Tang, Y. Park and T. Qiu, "NLOS mitigation for TOA location based on a modified deterministic model", Research Letters in Signal Processing, vol. 2008, ID 970461, 2008.
C.-D. Wann and C.-S. Hsueh, "NLOS mitigation with biased Kalman filters for range estimation in UWB systems", in Proc. IEEE TENCON, pp. 1-4, Oct. 2007.
Z. Deng, Y. Yu, W. Guan and L. He, "NLOS error mitigation based on modified Kalman filter for mobile location in cellular networks", in Proc. Int'l Conf. on Wireless Commun. and Signal Processing (WCSP), pp. 1-5, Oct. 2010.
S.A. Golden and S. S. Bateman, "Sensor measurements for Wi-Fi location with emphasis on time-of-arrival ranging," IEEE Trans. on Mobile Computing, vol. 6, No. 10, pp. 1185-1198, Oct. 2007.
LAN/MAN Standards Committee of the IEEE Computer Society. IEEE P802.11vTM /D7.0 Draft standard for information technology—Telecommunications and information exchange between systems—Local and metropolitan area networks—Specific requirements—Part 11: wireless LAN MAC and PHY specification amendment 8: Wireless network Management, Jul. 2009.
IEEE Std P802.1AS/D7.0, Draft Standard for Loccal and Metropolitan Area Networks—Timing and Synchronization for Time-Sensitive Applications in Bridged Local Area Networks, Mar. 2010.
Y. Bar-Shalom, X. R. Li, and T. Kirubarajan, Estimation with Applications to Tracking and Navigation, New York: John Wiley & Sons, 2001.
N. Alsindi, B. Alavi, K. Pahlavan, "Measurement and modeling of Ultra Wideband TOA-based ranging in indoor multipath environments," IEEE Transactions on Vehicular Technology, pp. 1046-1058, vol. 58, No. 3, Mar. 2009.
L. Zhang, Z. Liu and C. H. Xia, "Clock synchronization algorithms for network measurements", in Proc. IEEE INFOCOM, vol. 1, pp. 160-169, 2002.

* cited by examiner

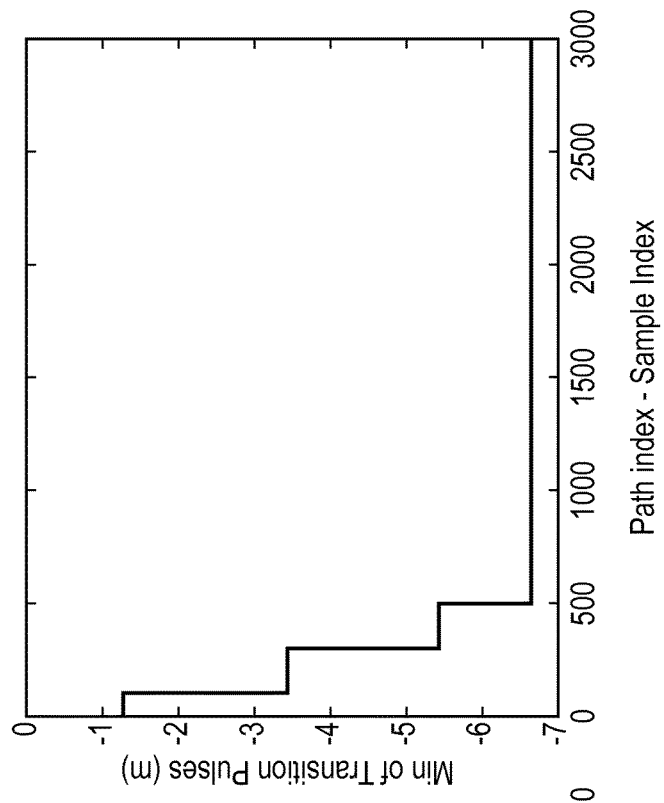
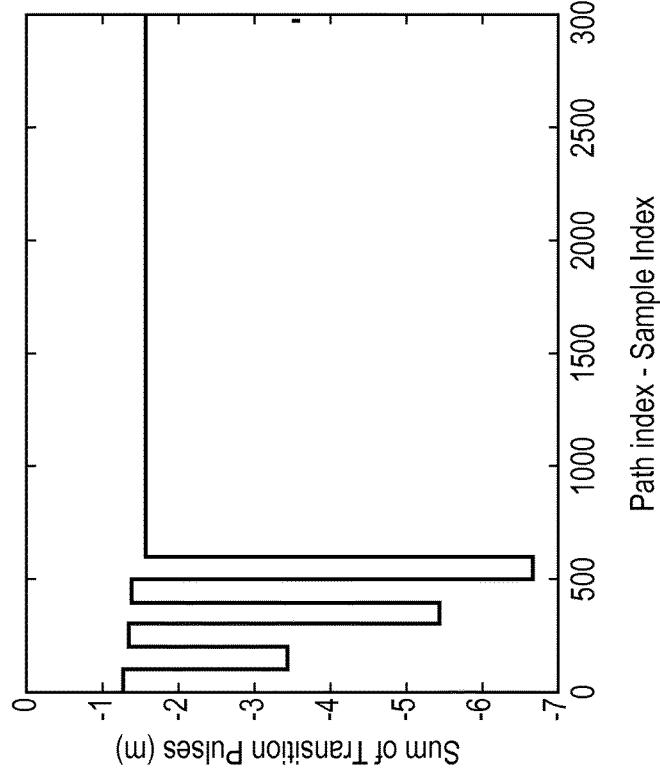
FIG. 21(b)
FIG. 21(a)

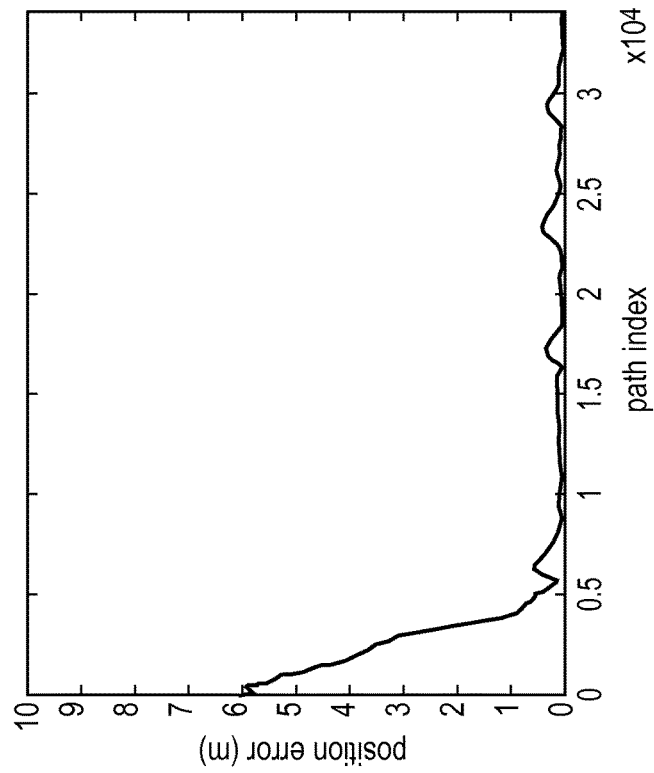
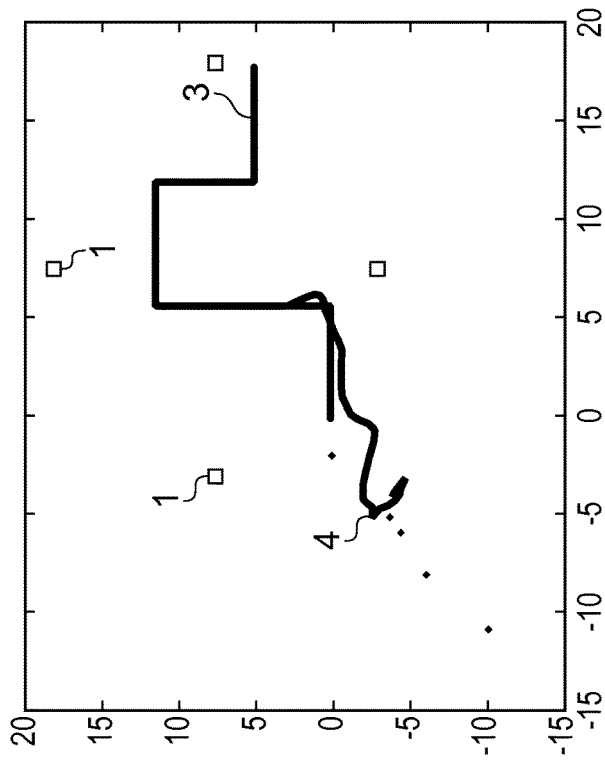
FIG. 26(b)
FIG. 26(a)

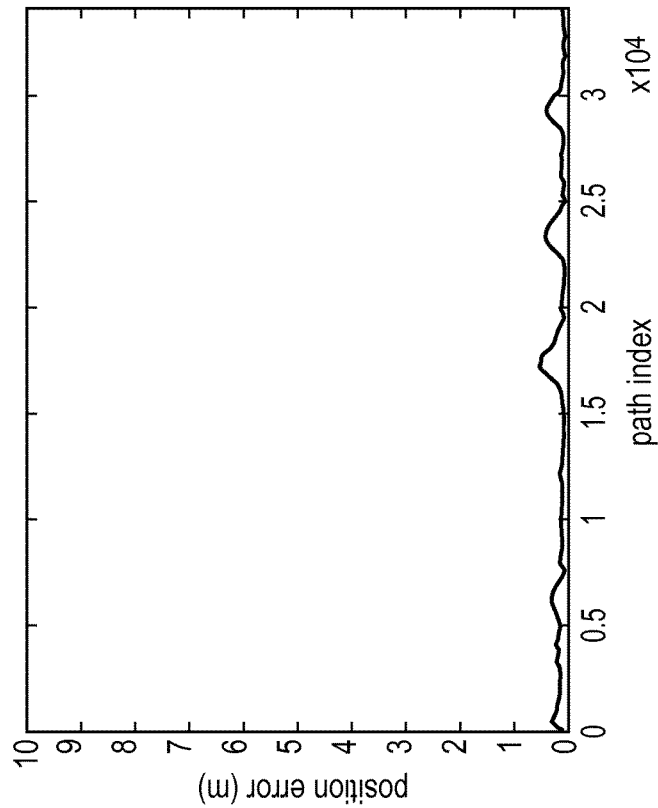
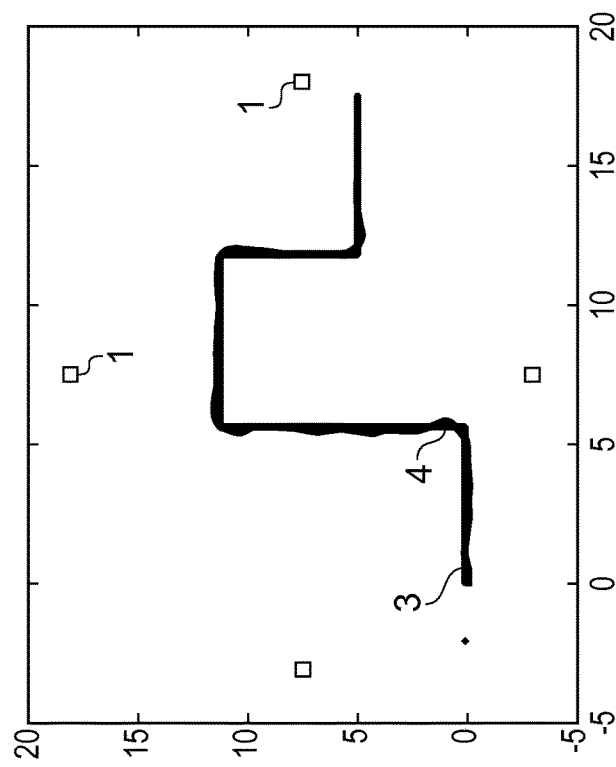
FIG. 30(a)
FIG. 30(b)

METHODS AND DEVICES FOR BIAS ESTIMATION AND CORRECTION

FIELD OF THE INVENTION

The present invention relates to methods and devices for bias estimation and correction. It is particularly, but not exclusively, concerned with bias estimation and correction in time-of-arrival (TOA) based wireless geolocation systems and more particularly systems that may operate in urban and indoor environments.

BACKGROUND OF THE INVENTION

Outdoor localization, thanks to GPS technology, has revolutionized navigation-based applications running on e.g. automotive GPS enabled devices and smart phones. Applications range from guiding drivers to their destination to providing a point-by-point direction to the closest cinema or coffee shop. The success of GPS can be attributed to the reliability, availability of line-of-sight (LOS) and practical accuracy that the orbiting satellites covering the globe provide.

Recently as the number of smart devices and mobile users has increased significantly, the potential for new indoor/urban location-based services and challenges has emerged. The lucrative business opportunities of location-enabled services are not limited to outdoors. In fact the potential of indoor location-enabled services has been projected by a number of sources as an untapped industry. The range of potential indoor applications touches every aspect of our lives: from tracking children in day-care centers, tracking elderly in nursing homes, to tracking inventories in warehouses, tracking medical devices in hospitals and tracking personnel in emergency/first responder applications (e.g. firefighters). The major challenges facing this emerging industry are non-existent GPS coverage, multipath propagation and the non-line-of-sight (NLOS) problem.

Position estimation is typically achieved through ranging (distance estimation or angle estimation) to different base stations (BSs) with known coordinates and solving a set of non-linear equations or through geometric relations. Geolocation technologies that depend on techniques such time of arrival (TOA), time difference of arrival (TDOA) and Angle of Arrival (AOA) require a clear LOS between the BSs (the orbiting satellite in GPS) and the mobile device (MD).

In low system bandwidths, multipath propagation can induce tens of meters of range errors; while NLOS propagation causes significant errors/biases (tens/hundreds of meters) to distance/angle estimation which affects the localization accuracy directly. Thus to enable accurate and robust localization in indoor/urban environments it is important to address and mitigate the biases that affect the range/distance estimation.

Existing NLOS bias mitigation literature can be generally sub-divided into two main groups. The first is NLOS identification and mitigation where the range measurements to different BSs are classified into LOS/NLOS and mitigated for. The second is NLOS bias tracking and correction which generally assume dynamic movement of the MD.

In the former approach the NLOS measurements are either ignored or are integrated in a weighted location optimization approach such as weighted least squares (WLS) or weighted constrained optimization algorithms [1].

In [2] a bias tracking algorithm is proposed where the biases are incorporated into a Kalman Filter (KF) formulation but this approach requires an a priori knowledge of the bias covariance matrix; which in realistic propagation conditions is difficult to obtain due to rapid fluctuations of the bias resulting a major weakness.

In [3] a statistical bias correction technique that works on the range measurements prior to the KF tracking stage is proposed. It is based on statistical processing of a record of measurements taken over a window but it relies on the statistical estimate of the NLOS measurement ratio present in the record. As a result it suffers from several flaws. First it assumes that there is zero bias in LOS environments; which is not true. Second it assumes that the statistics of the biases to be time-invariant within a short period which might not be the case in highly dynamic scenarios. Third, the approach requires a priori statistical characterization of the biases which is difficult to maintain in a highly changing dynamic environments such as indoors.

In [4], an extended KF (EKF) tracking is proposed with the state matrix augmented by the unknown bias vectors. The approach requires prefect knowledge of LOS/NLOS identification which is highly unrealistic; given that NLOS identification is a difficult prospect on its own and perfect identification is rarely, if ever, achieved. In addition the incorporation of the biases into the state vector requires estimating the bias covariance in real-time which is difficult in highly dynamic environments where the bias fluctuates significantly.

Another approach based on an improved KF is described for mobile tracking in NLOS environments where a smoothing stage is introduced to suppress NLOS errors in addition to integrating velocity and heading from motion sensors to improve the performance [5]. In addition to the zero bias assumption in LOS condition, the technique requires identification of LOS and NLOS through running mean/variance.

A NLOS bias correction through a weighting mechanism in wireless position systems has been proposed in [6].

In [7] a constrained optimization approach is used to estimate the biases which are assumed to affect NLOS only. The approach requires NLOS identification and the optimization algorithm is computationally expensive where it is incorporated with a tracking algorithm to estimate the position.

In [8] a NLOS mitigation approach is proposed that is based on constrained optimization (quadratic programming) to estimate and mitigate the impact of the biases. In additional to the computational complexity, the results of the simulations show that there is limited accuracy gain using this method.

In [9] a KF and a sliding window are used to identify NLOS conditions and smooth range measurements to improve range estimation accuracy.

In [10] statistical characterization of the NLOS biases (variance) is used to improve the accuracy of Kalman filter based algorithms.

What is common from the literature discussed above is that the techniques are usually incorporated with a KF, assume zero bias in LOS and require some form of LOS/NLOS identification in order to implement a statistical approach to bias correction. The zero bias in LOS and dependence on LOS/NLOS identification affects the practicality and robustness of the proposed techniques.

TOA-Based Localization and Tracking
TOA and Distance Estimation

Central to any localization and tracking system are the measurements that infer the geometrical relationships between the set of base stations (GPS satellites in GPS Systems, WiFi Access Points (AP) in WLAN Systems) and the mobile device (MD). Depending on the system used, geometrical information can be obtained through time measurements, angle measurements or both. The most popular approach is time-based, where the propagation time, $\tau$, between a base station (BS) and a MD is translated to distance through the speed of signal propagation equation $$\tau = \frac{d}{c} \qquad (1)$$

where d is the distance between the BS and the MD and c is the speed of signal propagation (usually assumed the speed of light—c=3e8 m/s). When the MD is stationary it is possible to estimate the position through popular multilateriation techniques and the TOA (range/distance) from the MD to the BSs forms a set of intersecting circles; where the location of the intersection is the location estimate (x, y).

FIG. 1 illustrates an example of TOA multilateration with 3 BSs 1. In ideal scenarios and with accurate range measurements, the intersection of the circles provides the exact location of the MD 2. In reality range measurements are corrupted with noise and biases, which expands the intersection point to an intersection region, thereby increasing the location uncertainty.

The accuracy of the position estimation will depend directly on the accuracy of the range measurements and also the relative geometry of the BSs 1 and the MD 2. If the range measurements are accurate and unbiased (zero mean and small measurement variance), then very accurate position estimation is possible. There are different techniques to estimate the TOA, but the simplest utilizes a two-way ranging mechanism as illustrated in FIG. 2.

Essentially Device 1 (the BS) initiates the two-way ranging by sending a ranging packet (signal) to Device 2 (the MD) and noting the time as $t_{TX1}$. Device 2 receives the signal at $t_{RX2}$ and prepares its own ranging signal (after a processing delay) and sends out a response ranging signal at time $t_{TX2}$. Finally Device 1 receives the response at $t_{RX1}$. Given that Device 2 shares the time stamp information $t_{RX2}$ and $t_{TX2}$ with Device 1 it is now possible to estimate the propagation delay (distance) between the two devices by $$\tau = [(t_{RX2} - t_{TX1}) + (t_{RX1} - t_{TX2})]/2 \qquad (2)$$

The main challenge using this approach is the delay inherent in software timestamping which has been reported to have a time resolution of 1-5 μs (0.3-1.5 km) [11]. Recently different IEEE standards such as IEEE 802.15.4, IEEE802.1as and IEEE 802.11v have been proposed to provide accurate and precise TOA-based ranging through physical layer amendments and hardware timestamping [12], [13]. The systematic errors due to time-stamping can be modeled as Gaussian and thus the range (distance) estimate can be modeled as $$\hat{d} = c\hat{\tau} = d + n \qquad (3)$$

where n is a zero-mean Gaussian random variable with variance $\sigma^2$; where the variance will depend on the time-stamping method used. For hardware time-stamping, nanosecond resolution/accuracy can be achieved compared to microsecond resolution in software time-stamping. Throughout the rest of the report we assume that one of the IEEE [12-17] standards of ranging/synchronization using hardware time stamping is used.

The Kalman Filter

In practice the MD 2 is usually moving (along with the person) and the static estimation of the MD location becomes a dynamic state estimation problem. For ideal zero-mean Gaussian conditions, an optimum solution to the problem is the Kalman Filter (KF) which estimates and tracks the location of the MD. Typically the KF relies on two main equations: the state equation and the measurement equation. The state equation describes the recursive relationship between the current state estimate and the next state estimate. The measurement equation describes the relationship between the available measurement (range/distance measurements) and the state. Depending on the motion model assumed, the state vector usually contains the coordinates of the MD (x, y) and the velocity ($v_x$, $v_y$). A popular motion model (which covers the most generic case) is the constant velocity model; where it is assumed that the MD moves in a constant velocity and the state equation is then given by [14]

$$x(k+1) = F(k)x(k) + G(k)w(k) \qquad (4)$$

where $x(k) = x(k|k) = [x(k), v_x(k), y(k), v_y(k)]^T$ is the state vector at the current sample time $t_k$, $$F(k) = \begin{bmatrix} 1 & T_s & 0 & 0 \\ 0 & 1 & 0 & 0 \\ 0 & 0 & 1 & T_s \\ 0 & 0 & 0 & 1 \end{bmatrix}$$

is the state transition matrix, and $$G(k) = \begin{bmatrix} T_s^2/2 & 0 \\ T_s & 0 \\ 0 & T_s^2/2 \\ 0 & T_s \end{bmatrix}$$

is the noise gain matrix and $w(k) = [w_x(k), w_y(k)]^T$ is the process noise (acceleration noise—jitter in the constant velocity movements) where $w_x(k)$ and $w_y(k)$ are Gaussian distributed with zero mean and variance $\sigma^2$ and $T_s = t_k - t_{k-1}$ is the sample time.

The measurement equation which relates the range measurements to the state is given by $$z(k) = H(k)x(k) + n(k) \qquad (5)$$

where H(k) is the measurement matrix and $n(k) = [n_1(k) \; n_2(k) \; \ldots \; n_M(k)]^T$ is the measurement noise where $n_m(k)$ is i.i.d. zero-mean Gaussian with variance $\sigma_n^2$, m∈[1, M] and M is the number of BSs covering the MD. The measurement equation in (5) assumes that the relationship between the state and the measurements is linear. For the localization problem this is not the case since the measurement equation is non-linear due to the non-linear relationship between the distance and the state or $$d(k) = \begin{bmatrix} \sqrt{(x_1 - x(k))^2 + (y_1 - y(k))^2} \\ \sqrt{(x_2 - x(k))^2 + (y_2 - y(k))^2} \\ \vdots \\ \sqrt{(x_M - x(k))^2 + (y_M - y(k))^2} \end{bmatrix} \qquad (6)$$

where ($x_m$, $y_m$), are the x- and y-coordinates of the $m^{th}$ BS. Thus in order to use the KF, the measurement equation has to be linearized around the current state estimate $\hat{x}(k)$ [14]. When either one or both the state and the measurement equations are non-linear then a linearized version of the KF, known as the extended KF (EKF), can be implemented. The linearization is achieved through Taylor series expansion and usually the first order term is retained, while the higher order terms are neglected [14]. The linearized measurement matrix is then given by $$H(k) = \begin{bmatrix} \frac{\partial d_1(k)}{dx} & 0 & \frac{\partial d_1(k)}{dy} & 0 \\ \frac{\partial d_2(k)}{dx} & 0 & \frac{\partial d_2(k)}{dy} & 0 \\ \vdots & \vdots & \vdots & \vdots \\ \frac{\partial d_M(k)}{dx} & 0 & \frac{\partial d_M(k)}{dy} & 0 \end{bmatrix} \quad (7)$$

where $\dfrac{\partial d_m(k)}{dx} = \dfrac{x_m - x(k)}{\sqrt{(x_m - x(k))^2 + (x_m - x(k))^2}}$ and $$\frac{\partial d_m(k)}{dy} = \frac{y_m - y(k)}{\sqrt{(y_m - y(k))^2 + (y_m - y(k))^2}}.$$

The main equation in the EKF is the state update equation [14]

$$\hat{x}(k+1|k+1) = \hat{x}(k+1|k) + W(k+1)v(k+1) \quad (8)$$

where $\hat{x}(k+1|k+1)$ is the estimated state, $\hat{x}(k+1|k)$ is the predicted state, $W(k+1)$ is the filter gain and $v(k+1)$ is the measurement residual (also referred to as the measurement innovation) [14]. The predicted state is obtained from the state equation (4) in the absence of process noise (representing ideal state transitions) and it is given by $$\hat{x}(k+1|k) = F(k)\hat{x}(k). \quad (9)$$

The measurement residual is the difference between the actual measurements and the predicted measurements and it is given by $$v(k+1) = z(k+1) - \hat{z}(k+1|k) \quad (10)$$

where $\hat{z}(k+1|k)$ is the predicted range measurement or $$\hat{z}(k+1|k) = \begin{bmatrix} \sqrt{(x_1 - \hat{x}(k+1|k))^2 + (y_1 - \hat{y}(k+1|k))^2} \\ \sqrt{(x_2 - \hat{x}(k+1|k))^2 + (y_2 - \hat{y}(k+1|k))^2} \\ \vdots \\ \sqrt{(x_M - \hat{x}(k+1|k))^2 + (y_M - \hat{y}(k+1|k))^2} \end{bmatrix}. \quad (11)$$

The filter gain is then [14]

$$W(k+1) = P(k+1|k)H(k+1)^T S(k+1)^{-1} \quad (12)$$

which is a function of the linearized measurement matrix $H(k)$, the state prediction covariance $P(k+1|k)$ and the residual covariance $S(k+1)$. The state prediction covariance is given by $$P(k+1|k) = \text{cov}(\hat{x}(k+1|k)) \quad (13)$$

$$= F(k)P(k|k)F(k) + G(k)Q(k)G(k)^T$$

where $P(k|k) = \text{cov}(\hat{x}(k|k))$ is the state covariance and $Q(k)$ is the covariance of the process noise and it is given by $Q(k) = \text{cov}(w(k))$. The residual covariance is given by $$S(k+1) = R(k+1) + H(k+1)P(k+1|k)H(k+1)^T \quad (14)$$

where $R(k) = \text{cov}(n(k))$ is the measurement covariance.

Localization and Tracking in Harsh Multipath Environments

Ranging and localization in urban and indoor environments face two major challenges that affect the performance. The first is multipath and the second is the non-line-of-sight (NLOS) problem. Both have received considerable attention recently in research and different approaches/algorithms have been proposed to enable more accurate and robust localization systems. In this section the problems are discussed and an explanation is given of how these challenges introduce biases into the distance/range estimation which ultimately degrade the localization and tracking accuracy.

The Multipath Problem

In a multipath propagation environment, the transmitted signal undergoes reflections, attenuations and diffractions prior to arriving at the receiver. At the receiver, replicas of the transmitted signal arrive attenuated, phase shifted and time-delayed. The multipath signal is a combination of those multiple signal arrivals given by $$r(t) = \sum_{i=1}^{L_p} \alpha_i e^{j\phi_i} s(t - \tau_i) \quad (15)$$

where $s(t)$ is the transmitted signal waveform, $r(t)$ is the received waveform, where $L_p$ is the number of MPCs, and $\alpha_i$, $\phi_i$ and $\tau_i$ are amplitude, phase and propagation delay of the signal traveling the $i^{th}$ path, respectively. The received signal is essentially the transmitted signal convolved with the channel impulse response (CIR) or $r(t) = s(t)*h(t)$. Then it follows that the CIR is given by, $$h(\tau) = \sum_{i=1}^{L_p} \alpha_i e^{j\phi_i} \delta(\tau - \tau_i) \quad (16)$$

where $\delta(\square)$ is the Dirac delta function.

In LOS conditions, multipath signals (especially in dense cluttered environment) tend to arrive fairly close to the direct path. If the inter-arrival time between the multipath components is much smaller than the time-domain resolution of the system (low bandwidth systems) then at the receiver the multiple signals will combine to create a cluster. The TOA estimate (from the receiver's point of view) will then be the peak of the cluster. FIG. 3 illustrates an example of a channel impulse response which shows how the multipath bias can corrupt TOA-based range estimates. It is clear in this case that the actual TOA is not equal to the estimated TOA. This difference in estimation is called the "multipath bias".

For higher system bandwidths, the multipath bias in LOS environments is usually smaller due to the higher time-resolution. In LOS the distance estimate can be modeled by $$\hat{d}_{LOS} = d + b_{LOS}(\omega, d) \pm n_{LOS} \quad (17)$$

where $b_{LOS} = b_m(\omega, d)$ is a bias induced by the multipath and it is a function of the system bandwidth and the distance between BS and MD [15]. $n_{LOS}$ is a zero-mean additive measurement noise. For large bandwidths (such as in Ultra Wideband systems), the biases range from centimeters to a meter and are usually positive [15]. Both exponential and lognormal distributions have been reported in literature as possible fit to the data [15]. In this report we model the biases with an exponential distribution due to the simplicity of the model and its ability to simulate different range error behaviors. The exponential model is given by $$f_b(b|LOS) = b_{min} + \lambda_{LOS} e^{-\lambda_{LOS} b} \quad (18)$$

where $\lambda_{LOS}$ is the rate parameter and $b_{min}$ is a constant bias that can model the minimum experienced multipath bias in different indoor environments. Clearly $b_{min}$ in open areas is smaller than cluttered environments. Also the minimum bias experienced in low bandwidth systems (WiFi) is much larger than that experienced in large bandwidth systems (UWB).

The NLOS Problem

In NLOS conditions there is an obstruction in the path of the transmitter and receiver. Depending on the type of obstruction and the relative distances of the transmitter/receiver to the obstruction, the channel behavior and ranging bias can vary significantly. There are two specific NLOS cases or conditions that occur in typical obstructed environments. The first is when the DP signal is attenuated but detected (albeit with weak SNR). This situation can arise naturally when the transmitter and receiver are separated by "light" obstructions such as a glass door, wooden door or sheet-rock thin walls. Indeed in this scenario TOA estimates can be obtained with good accuracy due to the detection of the DP signal. The second NLOS case can occur when there is a "heavy" obstruction between the transmitter and receiver which attenuates the DP severely making it difficult for the receiver to detect it. The first non-Direct path (NDP) component is then used for TOA estimation. This results in a significant bias that corrupts the TOA estimation and ultimately the position estimate. FIG. 4 provides an illustration of the two specific conditions occurring in NLOS environments. FIG. 4(a) shows "light" NLOS/NLOS-DP in which the direct path is attenuated but can be detected. FIG. 4(b) shows severe NLOS/NLOS-NDP in which the direct path is not detected at all.

In NLOS the estimated distance can be modeled as $$\hat{d}_{NLOS} = d + b_{NLOS} + n_{NLOS} \quad (19a)$$

$$b_{NLOS} = b_m + b_{pd} + b_B \quad (19b)$$

where $b_m$ is the bias induced by the multipath, $b_{pd}$ is the bias caused by the propagation delay through obstacles other than free-space and $b_B$ is a deterministic but spatially random (due to the unknown nature of the obstacle) additive bias that models the amount of bias induced due to the obstruction of the DP.

It is reasonable to model the range measurement biases similar to those in LOS but with some variation on the parameters. For example if we would assume that NLOS biases follow an exponential distribution then it can be valid given that there is a minimum bias which shifts the exponential distribution. Thus a valid model in this case is given by $$f_b(b|NLOS) = b_{min} + \lambda_{NLOS} e^{-\lambda_{NLOS} b} \quad (20)$$

where $b_{min} > 0$ and $\lambda_{NLOS} < \lambda_{LOS}$. The rate parameter $\lambda$ will control the magnitude of ranging biases and subsequently the probability of occurrence. $b_{min}$ can control the minimum bias that can occur where this addition is very useful as it can relate the range biases to a specific scenario.

Tracking Performance of EKF with Biased Range Measurements

In order to appreciate the impact of the biases on the tracking performance the present inventors tested the EKF under LOS and NLOS using different models, where the modeling parameters have been adopted from experimental findings reported in [15]. FIG. 5 illustrates the Cumulative Distribution Function (CDF) plots of the biases in LOS, NLOS and severe NLOS for two system bandwidths (WiFi (FIG. 5(a)) and UWB (FIG. 5(b))).

The exponential modeling parameters of the CDF plots are summarized in Table 1. Note that severe NLOS refers to NLOS but with a higher $b_{min}$; indicating that the MD is constantly ranging behind "heavy" obstructions.

TABLE 1

Range bias exponential modeling parameters for 2 system bandwidths

| System Bandwidth | Channel Condition | $b_{min}$ (m) | $\lambda$ |
|---|---|---|---|
| WiFi - 20 MHz | LOS | 1 | 1/3 |
| | NLOS | 1 | 1/8 |
| | Severe NLOS | 5 | 1/8 |
| UWB - 3 GHz | LOS | 0 | 2 |
| | NLOS | 0 | 1/3 |
| | Severe NLOS | 2 | 1/3 |

Next the impact of the biases in each condition/system on the EKF tracking performance is illustrated.

FIG. 6 illustrates the simulated tracking results for the different channel conditions using a WiFi system with 20 MHz bandwidth. In the simulation 4 BSs 1 are placed in an indoor environment surrounding the MD track 3 (actual track). FIG. 6(a) shows the tracking (predicted track 4) in LOS conditions, FIG. 6(b) shows the tracking the NLOS condition and FIG. 6(c) shows the tracking in severe NLOS conditions. For each condition, all range measurements from the MD to the BSs 1 experience error from the respective statistical distribution in FIG. 5(a) and Table 1.

For WiFi, range measurements in LOS experience large multipath biases because of the low time-resolution (low system bandwidth), see FIG. 5(a). The tracking performance of WiFi in LOS is impacted significantly. For NLOS condition, the biases are so large that the estimated track 4 is significantly biased. This indicates that if the MD receives range information from the BS biased around 5-15 meters with high probability, then it is extremely difficult to estimate and track the position accurately.

FIG. 7 illustrates the simulated tracking results for different conditions using a UWB system with 3 GHz bandwidth. As with FIG. 6, FIG. 7(a) is LOS, FIG. 7(b) is NLOS and FIG. 7(c) is severe NLOS. For each condition, all range measurements from the MD to the BSs 1 experience error from the respective statistical distribution in FIG. 5(b) and Table 1.

The performance of UWB systems in LOS improves significantly due to the high time-resolution capabilities thus combating multipath; which is a well known attribute of the technology [15]: see FIG. 7(a). Thus the predicted path 4 and the actual path 3 of the MD are almost identical and can hardly be distinguished.

The UWB performance in NLOS conditions degrades due to higher biases, but is better than the localization performance in WiFi systems (compare FIGS. 7(b) & (c) with FIGS. 6(b) and (c)). This is mainly due to the fact that UWB has higher time resolution enabling more accurate estimation of first arrival of non-direct path components.

The present invention aims to provide methods and systems which provide improved bias estimation, tracking and range/distance measurement correction as well as improved localization, particularly in NLOS/severe NLOS conditions.

SUMMARY OF THE INVENTION

An exemplary embodiment of the invention provides a method of estimating the bias in an estimated distance between a mobile device and a base station, the method including the steps of: receiving, in the mobile device, wireless signals from the base station; estimating, from said wireless signals, the distance of the mobile device from the base station; and recursively estimating, from said estimated distances and the changes between differences of said estimated distances, the bias experienced in each of said estimates.

A further exemplary embodiment of the invention provides a method of estimating a position of a mobile device in relation to a base station, the method including the steps of: receiving, in the mobile device, wireless signals from the base station; estimating, from said wireless signals, the uncorrected distance of the mobile device from the base station; recursively estimating, from said estimated distances and the changes between differences of said estimated distances, the bias experienced in each of said estimates; correcting uncorrected distance estimations to take account of the estimated bias in each of said uncorrected estimations; and estimating the position of the mobile device from said corrected distance estimations.

A further exemplary embodiment of the invention provides a wireless mobile device having a memory and a processor which is arranged to estimate the position of the mobile device, wherein: the mobile device is capable of receiving wireless signals from a plurality of base stations and estimating the distance of the mobile device from a base station based on the wireless signals received, and the processor is arranged to: repeatedly estimate, from said wireless signals, the uncorrected distance of the mobile device from the base station and store said uncorrected distance in said memory; recursively estimate, from said estimated distances and the changes between differences of said estimated distances, the bias experienced in each of said estimates; correct uncorrected distance estimations to take account of the estimated bias in each of said uncorrected estimations; and estimate the position of the mobile device from said corrected distance estimations.

A further exemplary embodiment of the present invention provides a positioning system for estimating the position of a mobile device, the system including the mobile device and a plurality of base stations, wherein the mobile device is capable of receiving wireless signals from said plurality of base stations, the system further including a processor which is arranged to estimate the position of the mobile device by: repeatedly estimating, from said wireless signals, the uncorrected distance of the mobile device from the base station; recursively estimating, from said estimated distances and the changes between differences of said estimated distances, the bias experienced in each of said estimates; correcting uncorrected distance estimations to take account of the estimated bias in each of said uncorrected estimations; and estimating the position of the mobile device from said corrected distance estimations.

BRIEF DESCRIPTION OF THE DRAWINGS

Embodiments of the invention will now be described by way of example with reference to the accompanying drawings in which:

FIG. 21(a) shows the sum of bias transitions in the system shown in FIG. 18 as applied to the example scenario (point D in FIG. 18) and FIG. 21(b) shows the tracking of the absolute minimum of the bias transitions;

FIG. 26(a) shows the localization and tracking performance in the system once the bias correction according to an embodiment of the present invention is applied and FIG. 26(b) shows the absolute positioning error;

FIG. 28(a) shows the initial step of calibrating the mobile devices to zero bias.

FIG. 30(a) shows the estimated and actual track of a mobile device in the embodiment shown in FIGS. 28 and 29 and FIG. 30(b) shows the positioning error in the estimated track of FIG. 30(a)

DETAILED DESCRIPTION

Figure 1:
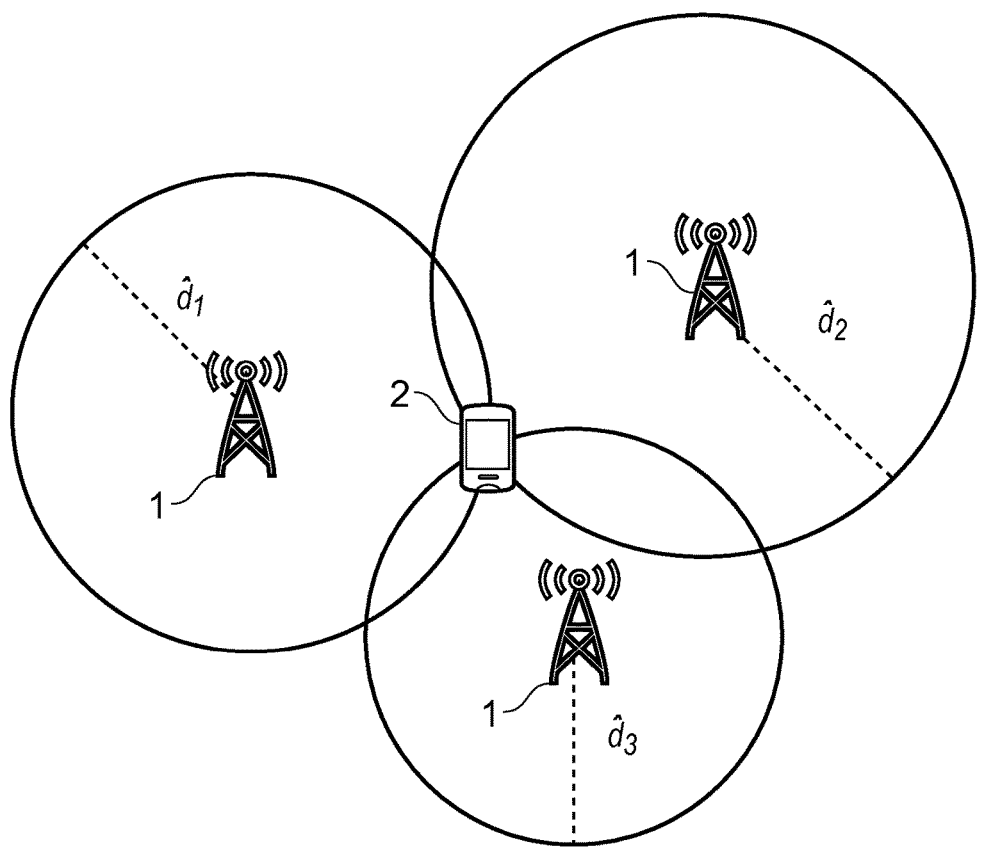
FIG. 1 shows the general principle of distance-based multilateration.
Figure 2:
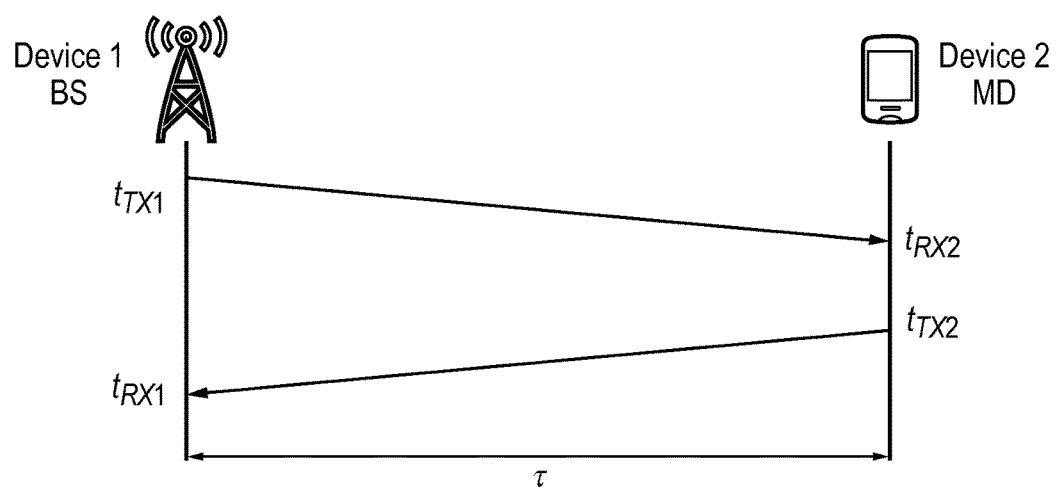
FIG. 2 shows the outline of two-way ranging using time-of-arrival.
Figure 3:
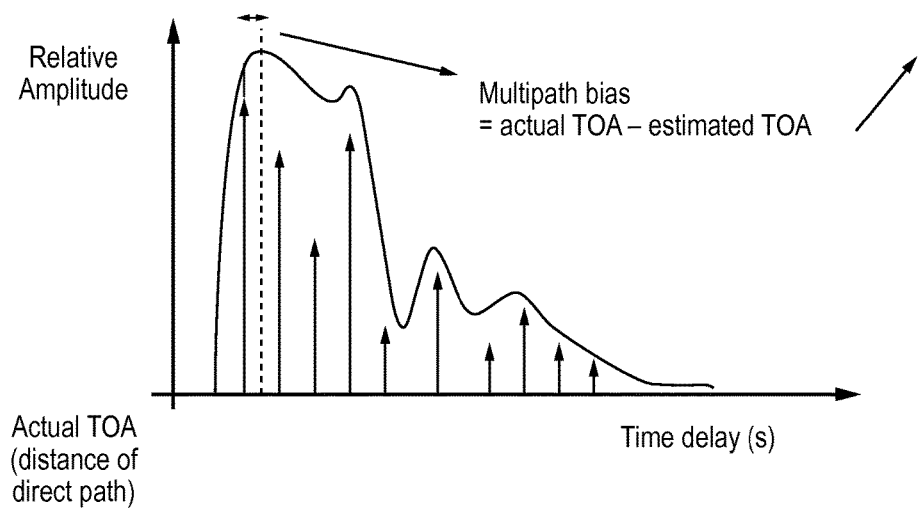
FIG. 3 shows a sample channel impulse response showing the effects of multipath bias.
Figure 4A:
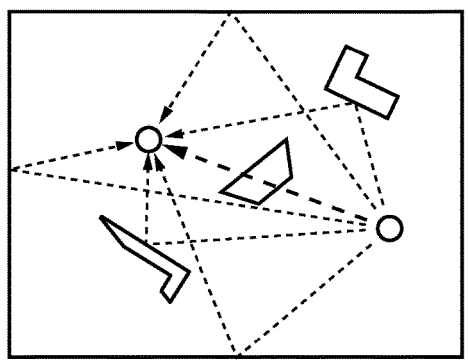
FIG. 4 illustrates NLOS multipath channels in "light" NLOS/NLOS-DP (FIG. 4(a)) and "severe" NLOS/NLOS-NDP (FIG. 4(b))
Figure 4B:
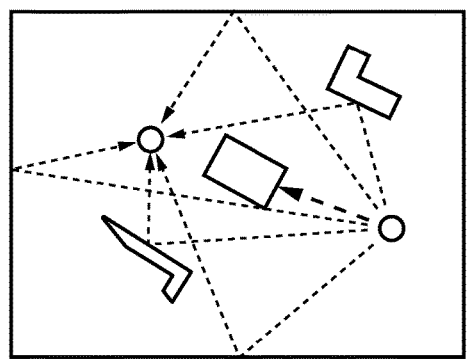
Figure 5A:
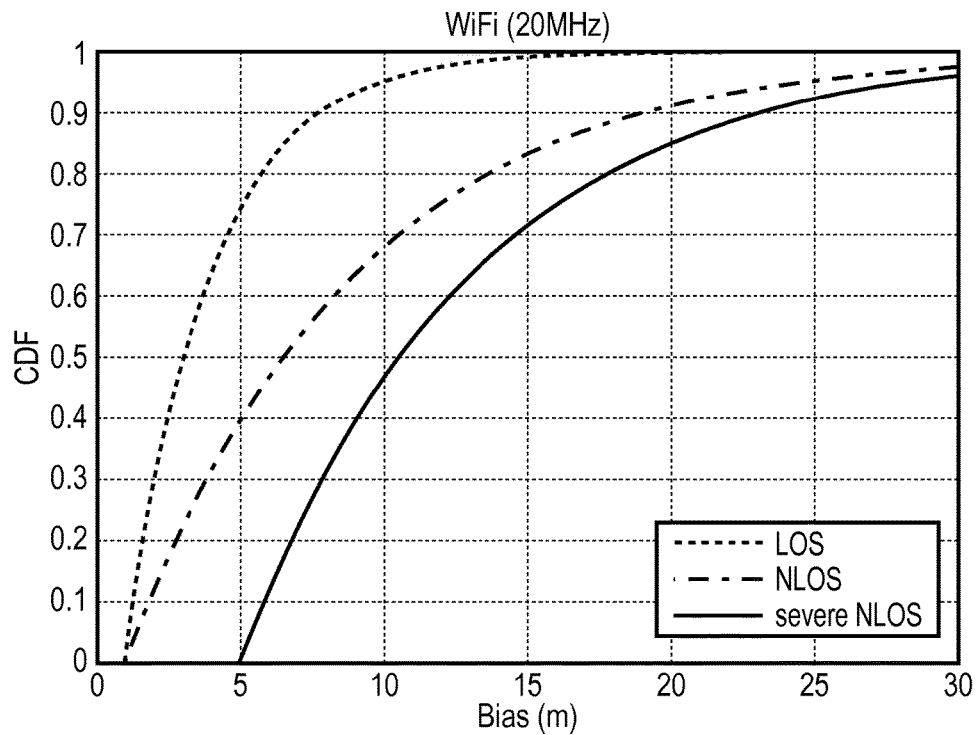
FIGS. 5a and 5b show the cumulative distribution function of range biases using an exponential model for LOS, NLOS and severe NLOS in the WiFi (20 MHz bandwidth) and UWB (3 GHz bandwidth) respectively.
Figure 5B:
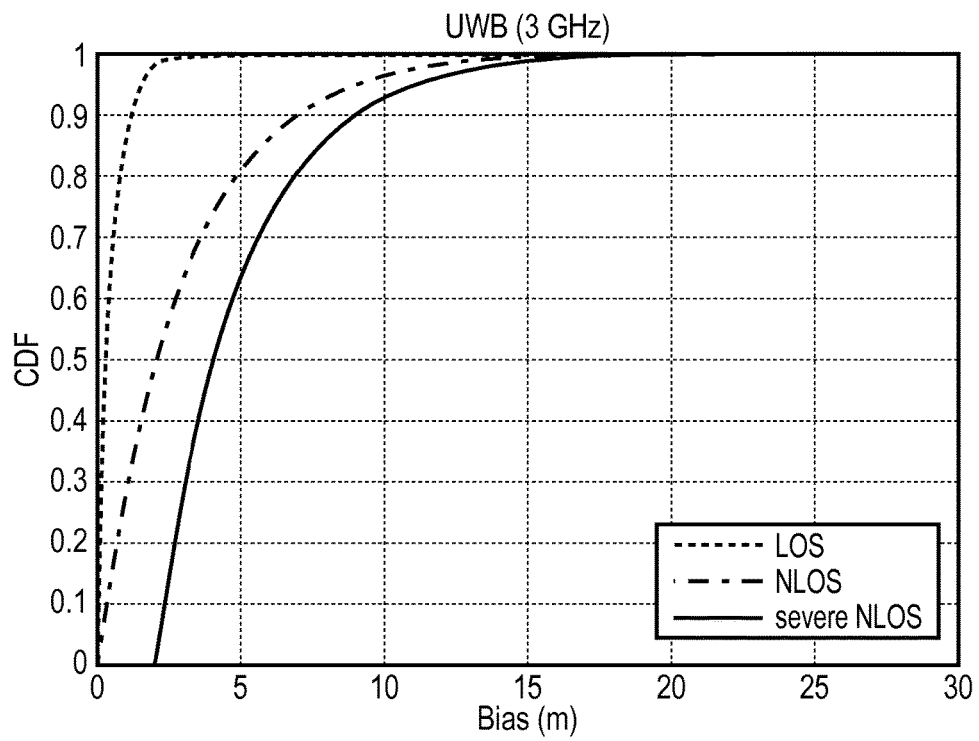

At their broadest, methods of the present invention provide for methods of estimating the bias in estimated distances between a mobile device and a base station by recursively estimating the bias and, optionally, determining the minimum such biases.

A first aspect of the present invention provides a method of estimating the bias in an estimated distance between a mobile device and a base station, the method including the steps of: receiving, in the mobile device, wireless signals from the base station; estimating, from said wireless signals, the distance of the mobile device from the base station; and recursively estimating, from said estimated distances and the changes between differences of said estimated distances, the bias experienced in each of said estimates.

The method of this aspect is particularly useful in harsh multipath or NLOS environments. It is particularly suited to indoor and/or urban environments, in which more accurate localization approaches (such as GPS) are not available.

Preferably the estimation of the distance of the mobile device from the base station uses time-of-arrival or time-difference-of-arrival ranging. There may be more than one base station and the bias estimation may be carried out for each base station.

The biases can be dynamically estimated from the differential bias changes that occur while the mobile device is moving. Once bias transitions occur then it is possible to lock onto the lowest experienced bias.

Thus the method of this aspect can have learning and convergence properties that result in accurate and robust localization and tracking.

The method of this aspect can be computationally efficient as it only requires simple algebraic operations, it does not assume zero bias in LOS and does not require LOS/NLOS identification. Further, no assumption about time invariance (stability of bias fluctuations) need be made.

Furthermore, each range measurement/bias sample can be a completely different realization. This is highly desirable in dynamic and motion intensive environments (e.g. shopping malls) where the bias is changing/fluctuating with high frequency.

The method can be integrated with a Kalman filter framework for position estimation and does not require (but can work with) inertial navigation systems (INS).

In some embodiments, the bias estimate $\hat{b}_i$ for the bias at time i is estimated using the recursive equation: $\hat{b}_i = \Delta\Delta\hat{d}_{i,i-1} + 2\hat{b}_{i-1} - \hat{b}_{i-2}$ wherein $\Delta\Delta\hat{d}_{i,i-1}$ is the second difference in the estimate of the distance between the mobile device and the base station between the times i and i−1.

Preferably the method further includes the steps of: determining the minimum of said estimated biases within a selected time period; and updating said estimated biases using said determined minimum bias.

Preferably the method further includes the steps of determining the absolute minimum bias of all said minimum biases across all time periods; and updating said estimated biases using the absolute minimum bias.

The minimum bias experienced across all time periods is likely to represent the best channel conditions (e.g. if LOS exists between the mobile device and the base station), and so can be used as an accurate base against which the other bias estimates can be calibrated.

Preferably the step of determining the minimum of said estimated biases includes the steps of: identifying decreases in the estimated bias between successive estimations; and filtering said decreases to identify decreases which are more than a predetermined threshold.

In identifying decreases in the estimated bias, drops in the bias to lower levels of bias can be identified and locked onto for the purposes of correcting earlier and subsequent estimates of the bias. Filtering assists by removing those decreases which are caused by noise in the bias estimation.

Preferably the step of determining the absolute minimum bias further includes the steps of: calculating a running sum of the differences between minimum bias values in subsequent time periods and identifying the absolute minimum bias as the minimum of said running sum.

By calculating the running sum of differences between minimum bias values, each bias drop can be tracked and preserved as it occurs, even if the distance or bias estimation that gave rise to that drop is no longer present in the selected time period.

In certain embodiments, the step of estimating the biases using the minimum and absolute minimum bias calculates the corrected bias estimate $\hat{b}_i^c$ at time i as: $\hat{b}_i^c = \hat{b}_i - \kappa_i + \sum_{k=1}^{i} \delta_k^p - \hat{\theta}_i$ wherein $\hat{b}_i$ is the bias estimate for the bias at time i, $\kappa_i$ is the minimum value of $\hat{b}_i$ within the selected time period, $\delta_i$ is the first difference of the minimum values $\kappa_i$ ($\delta_i = \kappa_i - \kappa_{i-1}$), $\delta_i^p$ is $\delta_i$ to which a threshold filter has been applied and $\hat{\theta}_i$ is a running estimate of $\theta$, the initial offset in the recursive bias estimation and is calculated as $$\hat{\theta}_i = \min\left(\sum_{k=1}^{i} \delta_k^p\right).$$

Preferably the recursive estimation of bias and the determination of the minimum bias are performed substantially in real time. Since the estimations are performed recursively and only on a selected time period, the computational requirements of the method of this aspect can be kept sufficiently low to allow the estimation to be carried out substantially in real time. This can allow the biases to be updated as further distance measurements are received and a real time estimation of the bias in those measurement made.

The method of the present aspect may include any combination of some, all or none of the above described preferred and optional features.

A second aspect of the present invention provides a method of estimating a position of a mobile device in relation to a base station, the method including the steps of: receiving, in the mobile device, wireless signals from the base station; estimating, from said wireless signals, the uncorrected distance of the mobile device from the base station; recursively estimating, from said estimated distances and the changes between differences of said estimated distances, the bias experienced in each of said estimates; correcting uncorrected distance estimations to take account of the estimated bias in each of said uncorrected estimations; and estimating the position of the mobile device from said corrected distance estimations.

The method of this aspect is particularly useful in harsh multipath or NLOS environments. It is particularly suited to indoor and/or urban environments, in which more accurate localization approaches (such as GPS) are not available.

Preferably the estimation of the distance of the mobile device from the base station uses time-of-arrival or time-difference-of-arrival ranging. There may be more than one base station and the bias estimation may be carried out for each base station. When more than one base station is present, the position estimation is preferably carried out using multi-lateration.

The biases can be dynamically estimated from the differential bias changes that occur while the mobile device is moving. Once bias transitions occur then it is possible to lock onto the lowest experienced bias.

Thus the method of this aspect can have learning and convergence properties that result in accurate and robust localization and tracking.

The method of this aspect can be computationally efficient as it only requires simple algebraic operations, it does not assume zero bias in LOS and does not require LOS/NLOS identification. Further, no assumption about time invariance (stability of bias fluctuations) need be made.

Furthermore, each range measurement/bias sample can be a completely different realization. This is highly desirable in dynamic and motion intensive environments (e.g. shopping malls) where the bias is changing/fluctuating with high frequency.

Preferably the step of estimating the position uses a Kalman filter applied to the corrected distance estimations. The method does not require (but can work with) inertial navigation systems (INS).

In some embodiments, the bias estimate $\hat{b}_i$ for the bias at time i is estimated using the recursive equation: $\hat{b} = \Delta\Delta\hat{d}_{i,i-1} + 2\hat{b}_{i-1} - \hat{b}_{i-2}$ wherein $\Delta\hat{d}_{i,i-1}$ is the second difference in the estimate of the distance between the mobile device and the base station between the times i and i−1.

Preferably the method further includes the steps of, prior to correcting said uncorrected distance estimations, determining the minimum of said estimated biases within a selected time period; and updating said estimated biases using said determined minimum bias.

Preferably the method further includes the steps of determining the absolute minimum bias of all said minimum biases across all time periods; and updating said estimated biases using the absolute minimum bias.

The minimum bias experienced across all time periods is likely to represent the best channel conditions (e.g. if LOS exists between the mobile device and the base station), and so can be used as an accurate base against which the other bias estimates can be calibrated.

Preferably the step of determining the minimum of said estimated biases includes the steps of: identifying decreases in the estimated bias between successive estimations; and filtering said decreases to identify decreases which are more than a predetermined threshold.

In identifying decreases in the estimated bias, drops in the bias to lower levels of bias can be identified and locked onto for the purposes of correcting earlier and subsequent estimates of the bias. Filtering assists by removing those decreases which are caused by noise in the bias estimation.

Preferably the step of determining the absolute minimum bias further includes the steps of: calculating a running sum of the differences between minimum bias values in subsequent time periods; and identifying the absolute minimum bias as the minimum of said running sum.

By calculating the running sum of differences between minimum bias values, each bias drop can be tracked and preserved as it occurs, even if the distance or bias estimation that gave rise to that drop is no longer present in the selected time period.

In some embodiments, the step of estimating the biases using the minimum and absolute minimum bias calculates the corrected bias estimate $\hat{b}_i^c$ at time i as: $\hat{b}_i^c = \hat{b}_i - \kappa_i + \sum_{k=1}^{i} \delta_k^p - \hat{\theta}_i$ wherein $\hat{b}_i$ is the bias estimate for the bias at time i, $\kappa_i$ is the minimum value of $\hat{b}_i$ within the selected time period, $\delta_i$ is the first difference of the minimum values $\kappa_i$ ($\delta_i = \kappa_i - \kappa_{i-1}$), $\delta_i^p$ is $\delta_i$ to which a threshold filter has been applied and $\hat{\theta}_i$ is a running estimate of θ, the initial offset in the recursive bias estimation and is calculated as $$\hat{\theta}_i = \min\left(\sum_{k=1}^{i} \delta_k^p\right).$$

Preferably the recursive estimation of bias and the determination of the minimum bias are performed substantially in real time. Since the estimations are performed recursively and generally only on a selected time period or using a running sum, the computational requirements of the method of this aspect can be kept sufficiently low to allow the estimation to be carried out substantially in real time. This can allow the biases to be updated as further distance measurements are received and a real time estimation of the bias in those measurement made.

In certain embodiments, the step of correcting also includes correcting historic distance estimations to improve the accuracy of previous estimates of the position of the mobile device. This backward correction can be very useful where the overall track of the mobile device is of interest and the tracking starts in severe NLOS conditions and so its position in the earlier stages of tracking is very uncertain. Backward correction can allow an accurate position estimate for those earlier stages to be made, for example after the mobile device has encountered LOS communication with a base station.

The method of embodiments of this aspect will be demonstrated in the examples below to correct range measurements providing biased measurements commensurate with the lowest experienced bias. For example if a zero bias to the base stations is experienced at least once during the navigation track then unbiased location estimation can be achieved.

In particular, these embodiments can dynamically and recursively reduce the bias error and pass the corrected measurements to the position estimation, for example an extended Kalman filter.

The method of the present aspect may include any combination of some, all or none of the above described preferred and optional features.

The methods of the above aspects is preferably implemented by a mobile device or a system according to the third or fourth aspects of this invention, as described below, but need not be.

Further aspects of the present invention include computer programs for running on computer systems which carry out the methods of the above aspects, including some, all or none of the preferred and optional features of that aspects.

At their broadest, systems of the present invention provide wireless mobile devices which can estimate their position compared to a plurality of base stations, having corrected initial uncorrected estimates of the position to take account of the estimated bias in those uncorrected measurements.

A third aspect of the present invention provides a wireless mobile device having a memory and a processor which is arranged to estimate the position of the mobile device, wherein: the mobile device is capable of receiving wireless signals from a plurality of base stations and estimating the distance of the mobile device from a base station based on the wireless signals received, and the processor is arranged to: repeatedly estimate, from said wireless signals, the uncorrected distance of the mobile device from the base station and store said uncorrected distance in said memory; recursively estimate, from said estimated distances and the changes between differences of said estimated distances, the bias experienced in each of said estimates; correct uncorrected distance estimations to take account of the estimated bias in each of said uncorrected estimations; and estimate the position of the mobile device from said corrected distance estimations.

The mobile device of this aspect is particularly suited to use in harsh multipath or NLOS environments. It is particularly suited to indoor and/or urban environments, in which more accurate localization approaches (such as GPS) are not available.

Preferably the estimation of the distance of the mobile device from the base station uses time-of-arrival or time-difference-of-arrival ranging. The position estimation is preferably carried out using multi-lateration.

The biases can be dynamically estimated from the differential bias changes that occur while the mobile device is moving. Once bias transitions occur then it is possible to lock onto the lowest experienced bias.

Thus the position estimation carried out by the mobile device of this aspect can have learning and convergence properties that result in accurate and robust localization and tracking.

The position estimation carried out by the mobile device of this aspect can be computationally efficient as it only requires a sliding window and simple algebraic operations, it does not assume zero bias in LOS and does not require LOS/NLOS identification. Further, no assumption about time invariance (stability of bias fluctuations) need be made. This means that the processor of the mobile device does not need to be particularly powerful and/or that the processor is able to carry out the position estimation whilst still carrying out other tasks that may be required of it.

Furthermore, each range measurement/bias sample can be a completely different realization. This is highly desirable in dynamic and motion intensive environments (e.g. shopping malls) where the bias is changing/fluctuating with high frequency.

Preferably the processor estimates the position uses a Kalman filter applied to the corrected distance estimations. The mobile device does not require (but can work with) an inertial navigation systems (INS).

In some embodiments, the processor estimates the bias $\hat{b}_i$ at time i using the recursive equation: $\hat{b}_i = \Delta\Delta\hat{d}_{i,i-1} + 2\hat{b}_{i-1} - \hat{b}_{i-2}$ wherein $\Delta\Delta\hat{d}_{i,i-1}$ is the second difference in the estimate of the distance between the mobile device and the base station between the times i and i−1.

Preferably the processor is further arranged to, prior to correcting said uncorrected distance estimations, determine the minimum of said estimated biases within a selected time period; and update said estimated biases using said determined minimum bias.

Preferably the processor is further arranged to, prior to correcting said uncorrected distance estimations, determine the absolute minimum bias of all said minimum biases across all time periods; and update said estimated biases by said absolute minimum bias.

Preferably the processor is further arranged to, when determining the absolute minimum bias, identify decreases in the estimated bias between successive estimations; and filter said decreases to identify decreases which are more than a predetermined threshold.

In identifying decreases in the estimated bias, drops in the bias to lower levels of bias can be identified and locked onto for the purposes of correcting earlier and subsequent estimates of the bias. Filtering assists by removing those decreases which are caused by noise in the bias estimation.

Preferably the processor is further arranged to: calculate a running sum of the differences between minimum bias values in subsequent time periods; and identify the absolute minimum bias as the minimum of said running sum.

By calculating the running sum of differences between minimum bias values, each bias drop can be tracked and preserved as it occurs, even if the distance or bias estimation that gave rise to that drop is no longer present in the selected time period.

In some embodiments, the processor estimates the biases using the minimum and absolute minimum bias by calculating the corrected bias estimate $\hat{b}_i^c$ at time i as: $\hat{b}_i^c = \hat{b}_i - \kappa_i + \Sigma_{k=1}^{i} \delta_k^p - \hat{\theta}_i$ wherein $\hat{b}_i$ is the bias estimate for the bias at time i, $\kappa_i$ is the minimum value of $\hat{b}_i$ within the selected time period, $\delta_i$ is the first difference of the minimum values $\kappa_i$ ($\delta_i = \kappa_i - \kappa_{i-1}$), $\delta_i^p$ is $\delta_i$ to which a threshold filter has been applied and $\hat{\theta}_i$ is a running estimate of $\theta$, the initial offset in the recursive bias estimation and is calculated as $$\hat{\theta}_i = \min\left(\sum_{k=1}^{i} \delta_k^p\right).$$

Preferably the recursive estimation of bias and the determination of the minimum bias are performed substantially in real time. Since the estimations are performed recursively and generally only on a selected time period or by using a running sum, the computational requirements on the processor can be kept sufficiently low to allow the estimation to be carried out substantially in real time. This can allow the biases to be updated as further distance measurements are received and a real time estimation of the bias in those measurement made.

A fourth aspect of the present invention provides a positioning system for estimating the position of a mobile device, the system including the mobile device and a plurality of base stations, wherein the mobile device is capable of receiving wireless signals from said plurality of base stations, the system further including a processor which is arranged to estimate the position of the mobile device by: repeatedly estimating, from said wireless signals, the uncorrected distance of the mobile device from the base station; recursively estimating, from said estimated distances and the changes between differences of said estimated distances, the bias experienced in each of said estimates; correcting uncorrected distance estimations to take account of the estimated bias in each of said uncorrected estimations; and estimating the position of the mobile device from said corrected distance estimations.

The system of this aspect is particularly suited to use in harsh multipath or NLOS environments. It is particularly suited to indoor and/or urban environments, in which more accurate localization approaches (such as GPS) are not available.

Preferably the estimation of the distance of the mobile device from the base station uses time-of-arrival or time-difference-of-arrival ranging. The position estimation is preferably carried out using multi-lateration.

The biases can be dynamically estimated from the differential bias changes that occur while the mobile device is moving. Once bias transitions occur then it is possible to lock onto the lowest experienced bias.

Thus the position estimation carried out by the system of this aspect can have learning and convergence properties that result in accurate and robust localization and tracking.

The position estimation carried out by the system of this aspect can be computationally efficient as it only requires a sliding window and simple algebraic operations, it does not assume zero bias in LOS and does not require LOS/NLOS identification. Further, no assumption about time invariance (stability of bias fluctuations) need be made. This means that the processor of the mobile device does not need to be particularly powerful and/or that the processor is able to carry out the position estimation whilst still carrying out other tasks that may be required of it.

Furthermore, each range measurement/bias sample can be a completely different realization. This is highly desirable in dynamic and motion intensive environments (e.g. shopping malls) where the bias is changing/fluctuating with high frequency.

Preferably the processor estimates the position uses a Kalman filter applied to the corrected distance estimations. The system does not require (but can work with) an inertial navigation systems (INS).

In some embodiments, the processor estimates the bias $\hat{b}_i$ at time i using the recursive equation: $\hat{b}_i = \Delta\Delta\hat{d}_{i,i-1} + 2\hat{b}_{i-1} - \hat{b}_{i-2}$ wherein $\Delta\Delta\hat{d}_{i,i-1}$ is the second difference in the estimate of the distance between the mobile device and the base station between the times i and i−1.

Preferably the processor is further arranged to, prior to correcting said uncorrected distance estimations, determine the minimum of said estimated biases within a selected time period and update said estimated biases using said determined minimum bias.

Preferably the processor is further arranged to, prior to correcting said uncorrected distance estimations, determine the absolute minimum bias of all said minimum biases across all time periods; and update said estimated biases by said absolute minimum bias.

Preferably the processor is further arranged to: identify decreases in the estimated bias between successive estimations; and filter said decreases to identify decreases which are more than a predetermined threshold.

In identifying decreases in the estimated bias, drops in the bias to lower levels of bias can be identified and locked onto for the purposes of correcting earlier and subsequent estimates of the bias. Filtering assists by removing those decreases which are caused by noise in the bias estimation.

Preferably the processor is further arranged to, when determining the absolute minimum bias: calculate a running sum of the differences between minimum bias values in subsequent time periods; and identify the absolute minimum bias as the minimum of said running sum.

By calculating the running sum of differences between minimum bias values, each bias drop can be tracked and preserved as it occurs, even if the distance or bias estimation that gave rise to that drop is no longer present in the selected time period.

In some embodiments, the processor estimates the biases using the minimum and absolute minimum bias by calculating the corrected bias estimate $\hat{b}_i^c$ at time i as: $\hat{b}_i^c = \hat{b}_i - \kappa_i + \Sigma_{k=1} \delta_k^p - \hat{\theta}_i$ wherein $\hat{b}_i$ is the bias estimate for the bias at time i, $\kappa_i$ is the minimum value of $\hat{b}_i$ within the selected time period, $\delta_i$ is the first difference of the minimum values $\kappa_i$ ($\delta_i = \kappa_i - \kappa_{i-1}$), $\delta_i^p$ is $\delta_i$ to which a threshold filter has been applied and $\hat{\theta}_i$ is a running estimate of $\theta$, the initial offset in the recursive bias estimation and is calculated as $$\hat{\theta}_i = \min\left(\sum_{k=1}^{i} \delta_k^p\right).$$

Preferably the recursive estimation of bias and the determination of the minimum bias are performed substantially in real time. Since the estimations are performed recursively and generally only on a selected time period or using a running sum, the computational requirements on the processor can be kept sufficiently low to allow the estimation to be carried out substantially in real time. This can allow the biases to be updated as further distance measurements are received and a real time estimation of the bias in those measurement made.

In certain embodiments, the step of correcting also includes correcting historic distance estimations to improve the accuracy of previous estimates of the position of the mobile device. This backward correction can be very useful where the overall track of the mobile device is of interest and the tracking starts in severe NLOS conditions and so its position in the earlier stages of tracking is very uncertain. Backward correction can allow an accurate position estimate for those earlier stages to be made, for example after the mobile device has encountered LOS communication with a base station.

The system of the present aspect may include any combination of some, all or none of the above described preferred and optional features.

Bias Correction—System Overview

Figure 8:
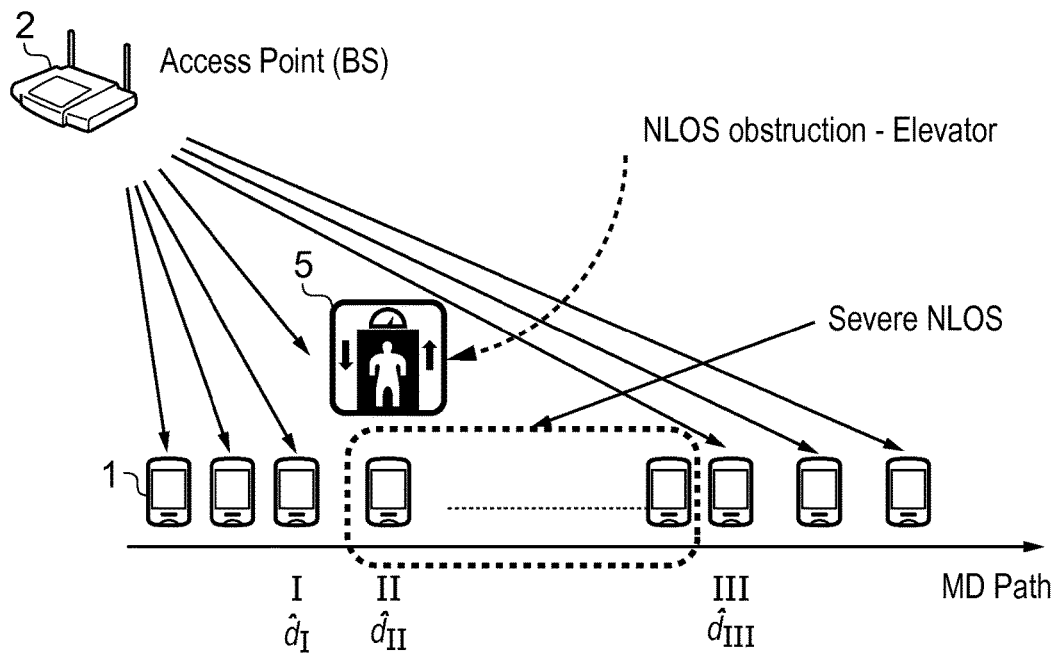
FIG. 8 shows an example ranging scenario for a mobile device moving between different reception conditions.

In order to introduce and explain the embodiments of the present invention a simple scenario set out in FIG. 8 is considered. A MD 1 is ranging to a BS 2 and starts out in LOS with small bias errors.

Figure 9:
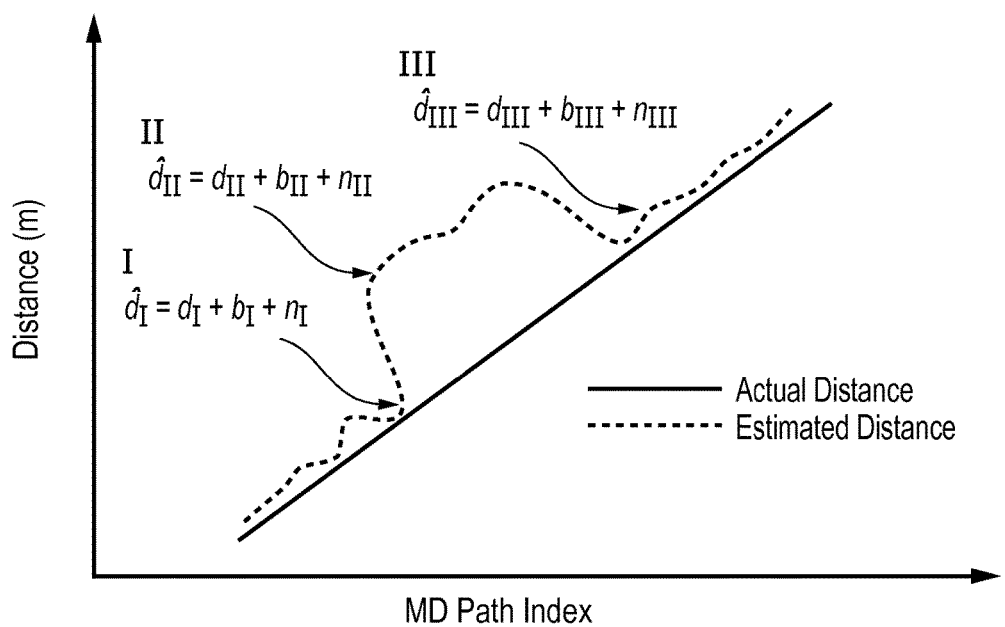
FIG. 9 shows the evolution of the distance and respective range measurement in the scenario of FIG. 8.

As the device moves along the path as illustrated in FIG. 8, it is shadowed by an elevator 5 and the channel condition switches to NLOS. If we examine the evolution of the actual distance between the BS 2 and the MD 1, we notice that in this case it gradually increases. The evolution of the range measurements should follow that of the actual distance but with positive biases. FIG. 9 illustrates the evolution of the distance and the range measurements. As the MD 1 moves behind the obstruction (an elevator 5 in this example) the range measurements experience a sudden bias jump due to the blocking of the direct path signal by the obstruction. Once the MD 1 moves out of the shadow of the obstruction, the range measurements drop back to the original baseline.

As the MD 1 moves from a LOS to a NLOS channel condition, as this example shows, there is a positive jump between the range measurement $\hat{d}_I$ and $\hat{d}_{II}$ and the difference can be given by $$\Delta \hat{d}_{II,I} = \hat{d}_{II} - \hat{d}_I = \\ = d_{II} + b_{II} + n_{II} - (d_I + b_I + n_I) \\ = \Delta d_{II,I} + \Delta b_{II,I} + \Delta n_{II,I} \quad (21)$$

where $\Delta d_{II,I} = d_{II} - d_I$, $\Delta b_{II,I} = b_{II} - b_I$ and $\Delta n_{II,I} = n_{II} - n_I$. Thus for a small sample time, $T_s$, the difference between actual distances is small, that is $\Delta d_{II,I} \approx 0$ and it is the geometrical change in the distance between the two subsequent locations. Thus in this example any significant change in $\Delta \hat{d}_{II,I}$ will be due to $\Delta b_{II,I}$. If we further assume that $b_I = b_{min} \approx 0$, the minimum bias experienced, then it is possible to estimate $b_{II}$ as $\hat{b}_{II} = \Delta b_{II,I}$ and correct the range measurement $\hat{d}_{II}$ by subtracting $\hat{b}_{II}$ or $$\hat{d}_{II}^c = \hat{d}_{II} - \hat{b}_{II}. \quad (22)$$

Figure 10:
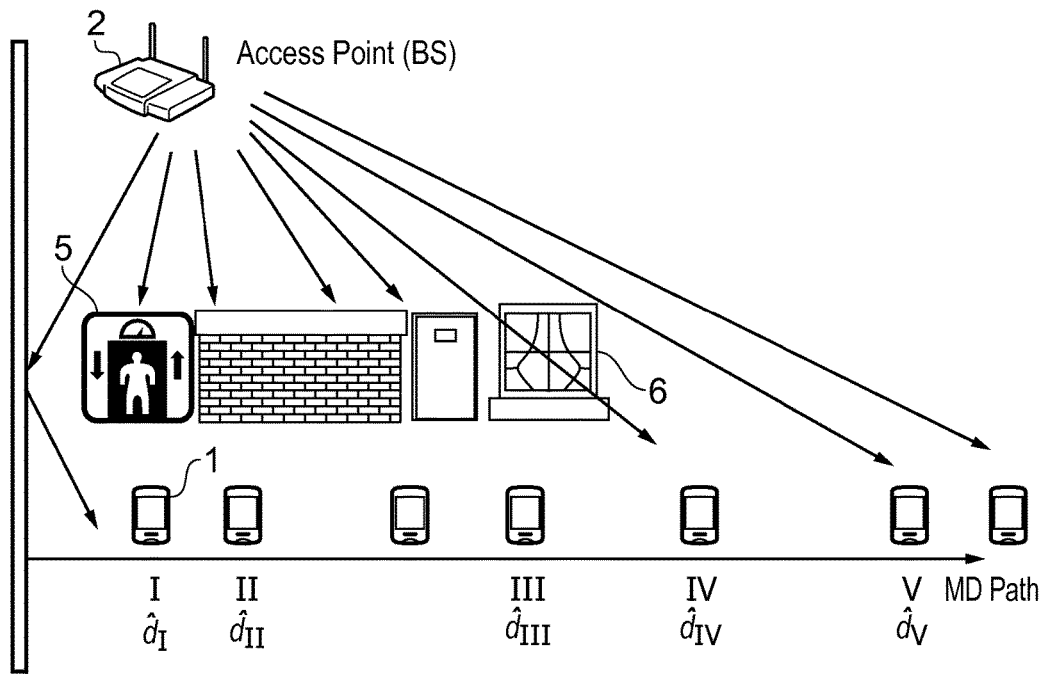
FIG. 10 shows another example ranging scenario for a mobile device moving between different reception conditions.

In a more general scenario the MD 1 might move from a severe NLOS to a light NLOS and then to LOS. As a result it would be possible to estimate the bias drops and essentially "lock" on the best minimum bias, $b_{min}$. FIG. 10 illustrates an example in which the MD 1 is moving and experiencing different NLOS obstacles, including "light" NLOS where the direct path signal can reach the MD 1 (e.g. through a window 6).

Figure 11:
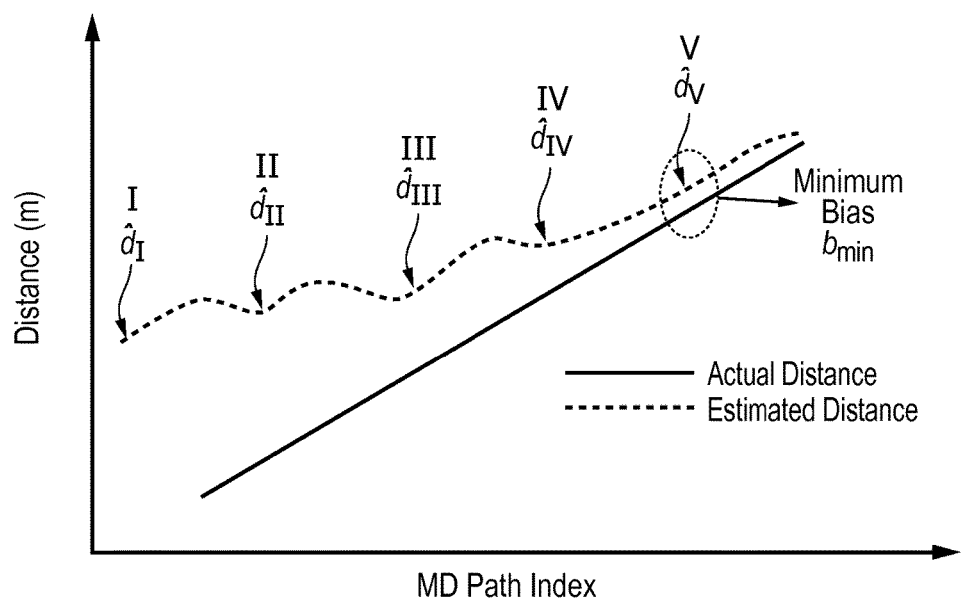
FIG. 11 shows the evolution of the distance and respective range measurement in the scenario of FIG. 10.

The resulting evolution of the distance and estimated (biased) range measurements is illustrated in FIG. 11.

Thus if the minimum bias experienced (the largest differential range measurement drop) can be tracked, then a baseline with which to compare all subsequent and previous range measurements can be established. It is then possible to continuously estimate subsequent jumps and subtract them from the range measurements.

Figure 12:
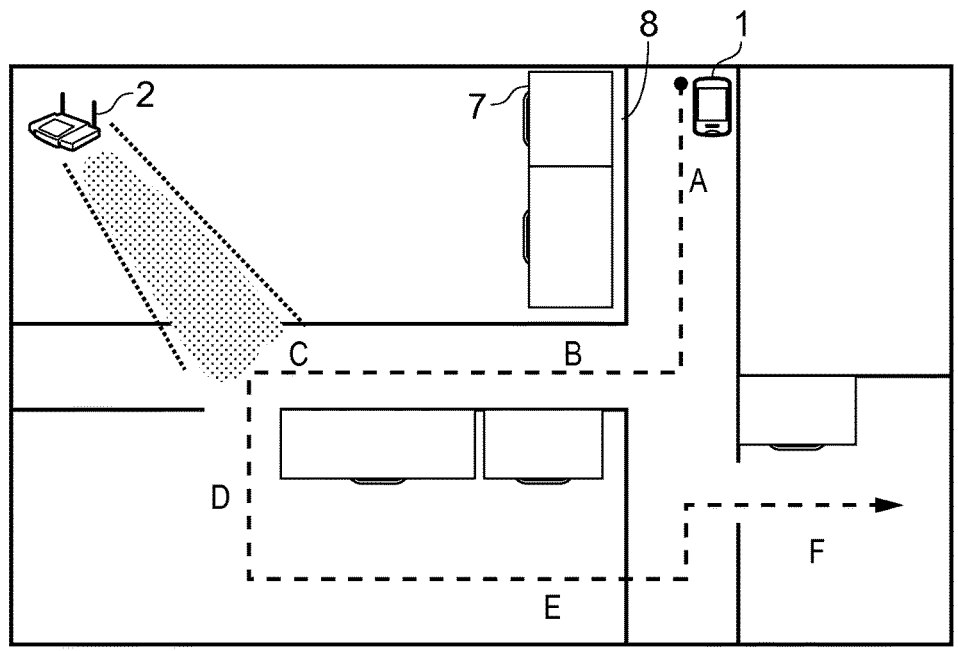
FIG. 12 shows another example ranging scenario in an indoor environment.

FIG. 12 shows an example of a MD ranging scenario in a typical indoor office environment and illustrates how, after establishing that the current measurement sample is the minimum bias, correction can be achieved for subsequent steps.

In this example scenario, the MD 1 is moving along the path from point A to point F. At point A, a set of cabinets 7 and a wall 8 obstructs the DP from the BS 2 and the NLOS condition induces large biases. As the MD moves, the condition somewhat improves and at point C the channel condition changes to LOS resulting in small bias errors.

Figure 13A:
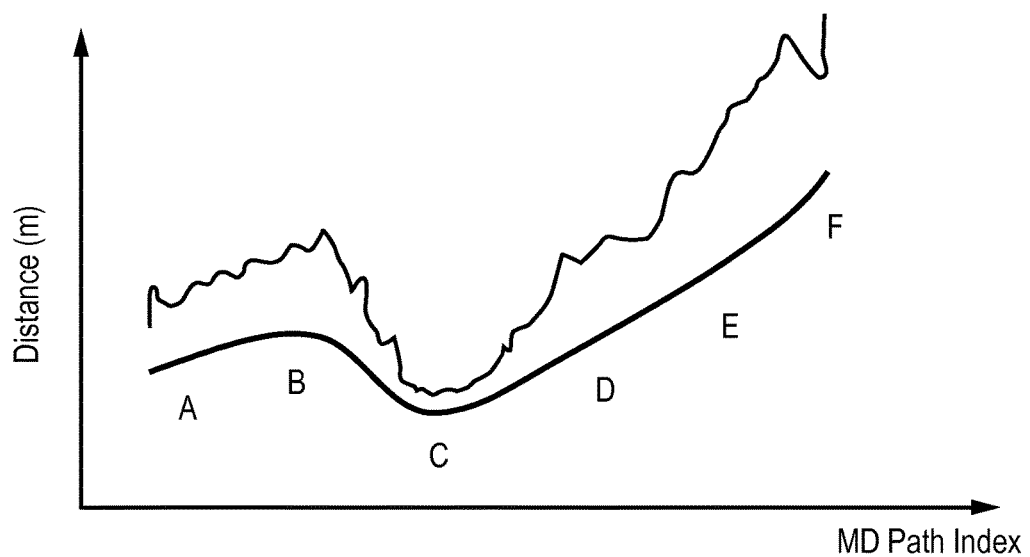
FIG. 13(a) shows the evolution of distance and respective range measurement in the scenario of FIG. 12
Figure 13B:
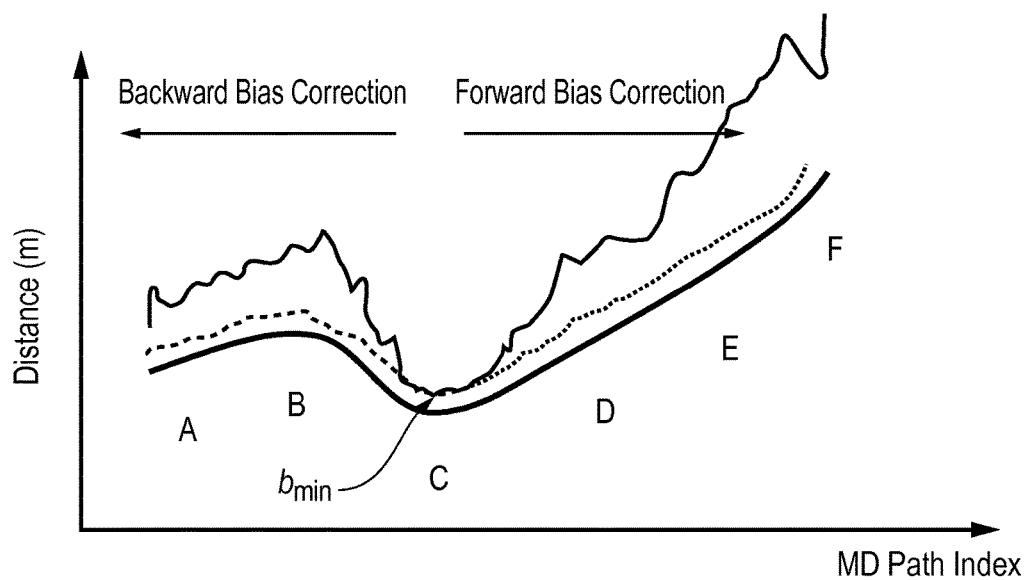
FIG. 13(b) shows the use of backwards and forward bias correction according to embodiments of the present invention.

FIG. 13(a) shows the resulting evolution of the distance and respective range measurement for the MD in the scenario of FIG. 12. FIG. 13(b) shows how forward and backward bias correction can be made from this data. The lower smooth curve is the evolution of actual distance in each case. The upper, jagged curve is the evolution of the biased range measurements.

The range estimates experience several drops indicating a reduction in the experienced bias as the NLOS channel improves. Eventually, at point C, the range measurements become LOS and the bias is reduced significantly (compared to A and B).

Once a minimum bias is established then any subsequent bias errors relative to the minimum can be subtracted from the range measurements; thus achieving forward bias correction, as shown by the middle line in FIG. 13(b). Similarly, backward bias correction can be achieved to correct previous biased measurements.

Forward bias correction is necessary to improve localization and tracking in real-time. Backward bias correction, however, can be of great value as well; since it can be used to correct the MD track/path took prior to reaching the minimum bias location. An example of where backward bias correction might be useful is tracking shoppers in a shopping mall. Once the user enters the mall, depending on the location of the BSs relative to the MD, the range measurements might be in NLOS (heavily biased). Thus the estimated position or track will not be accurate. However as the user moves around the mall, then the range measurements will be recursively corrected and the real-time track and previous track will be corrected. The forward/backward correction will not only improve the real-time tracking, but also provide a more accurate track history and this information can be very useful for many applications, from a commercial point of view. For security applications backward bias correction can be of great importance. If a user enters into a building un-authorized, then obtaining a reliable estimate of the track history can provide an indication of where the user entered and where he/she spent time; thereby identifying security breach points and activities.

Figure 14:
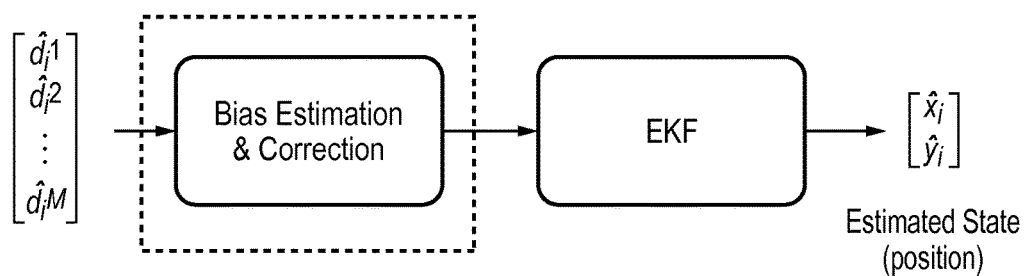
FIG. 14 shows an outline of the steps in a method according to an embodiment of the present invention.

Bias correction can be easily integrated within a KF framework. The range measurements obtained between the BSs and the MD can be corrected in real-time and fed to a KF as illustrated in FIG. 14.

The estimated range (i.e. the distance estimate) can converge to unbiased range measurements if at least one range measurement experiences zero bias in LOS. Alternatively it can converge to the minimum bias that is experienced while the MD moves in an indoor/urban environment.

Detailed Implementation

A more formal analysis of the above embodiments will now be set out. The starting point is the range measurements between a MD 1 and a BS 2 which can be modeled as $$\hat{d}_i = d_i + b_i + n_i \quad (23)$$

where $d_i$ is the actual distance between the MD and the BS at the ith sample time $i \in \{1, N\}$ and $b_i$ is the bias induced due to either LOS (multipath) or NLOS (multipath and DP obstruction) and $n_i$ is the zero-mean Gaussian measurement noise with variance $\sigma_i^2$.

Given a sequence of range measurements between a MD and a BS $\{\hat{d}_1, \hat{d}_2, \ldots, \hat{b}_N\}$ obtained while moving through the multipath propagation environment the aim is to estimate the corresponding sequence of biases $\{b_1, b_2, \ldots, b_N\}$. If the biases can be accurately estimated then the range measurements in (23) can be corrected to provide unbiased (clean) range measurements to the KF.

The method according to an embodiment of the invention provides an approach that examines the differential information available between the range measurements to estimate the biases. The general first difference equation between two subsequent range measurements obtained at time steps $t_i$ and $t_{i-1}$ can be established as $$\Delta \hat{d}_{i,i-1} = \hat{d}_i - \hat{d}_{i-1} = \Delta d_{i,i-1} + \Delta b_{i,i-1} + \Delta n_{i,i-1}, \quad (24)$$

where the sample time is $T_s = t_i - t_{i-1}$, $\Delta b_{i,i-1} = b_i - b_{i-1}$ and $\Delta n_{i,i-1} = n_i - n_{i-1}$. Using (24) the second difference equation can be defined by $$\Delta \Delta \hat{d}_{i,i-1} = \Delta \hat{d}_{i,i-1} - \Delta \hat{d}_{i-1,i-2} \quad (25)$$
$$= (\Delta d_{i,i-1} - \Delta d_{i-1,i-2}) + (\Delta b_{i,i-1} - \Delta b_{i-1,i-2}) + (\Delta n_{i,i-1} - \Delta n_{i-1,i-2})$$
$$= \Delta \Delta d_{i,i-1} + \Delta \Delta b_{i,i-1} + \Delta \Delta n_{i,i-1}$$

Note that the second difference equation is essentially the sum of the second differences between the actual distance, the bias and the measurement noise. After some algebra (25) simplifies to $$\Delta \Delta \hat{d}_{i,i-1} = \Delta \Delta d_{i,i-1} + b_i - 2b_{i-1} + b_{i-2} + \Delta \Delta n_{i,i-1} \quad (26)$$

which can be re-arranged to obtain $b_i$ recursively or $$b_i = \Delta \Delta \hat{d}_{i,i-1} - \Delta \Delta d_{i,i-1} + 2b_{i-1} - b_{i-2} - \Delta \Delta n_{i,i-1}. \quad (27)$$

Since in practice only $\Delta \Delta \hat{d}_{i,i-1}$ and an estimate of the previous two biases $\hat{b}_{i-1}$ and $\hat{b}_{i-2}$ are available then instead a recursive estimate of the bias at i can be obtained as, $$\hat{b}_i = \Delta \Delta \hat{d}_{i,i-1} + 2\hat{b}_{i-1} - \hat{b}_{i-2}. \quad (28)$$

Figure 15:
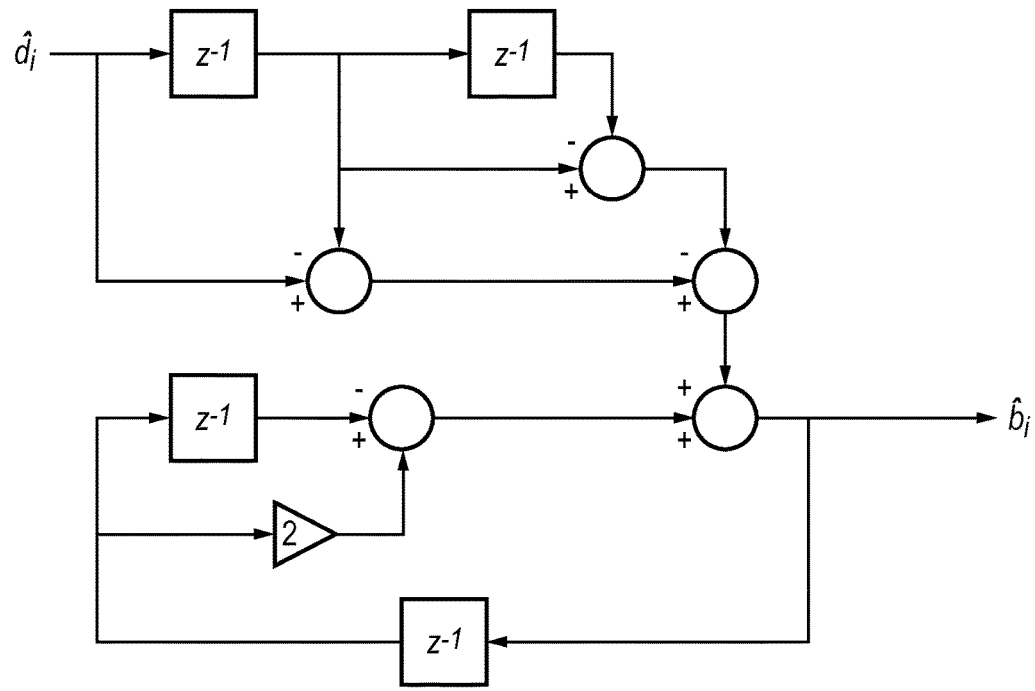
FIG. 15 shows a system diagram for recursive bias estimation according to an embodiment of the present invention.

FIG. 15 illustrates a block diagram of the recursive estimator.

The recursive bias estimation starts with the assumption that the first estimated bias is the minimum bias and it is therefore zero or $$\hat{b}_1 = b_{min} = 0. \quad (29)$$

Since in general this assumption is not always true (except in unique cases as will be discussed later), this introduces an initial offset in the recursive bias estimation or $$\theta = b_1 - \hat{b}_1 = b_1. \quad (30)$$

Next in order to compute $\hat{b}_2$ using (28) both $\hat{b}_1$ and $\hat{b}_0$ are required. Since $\hat{b}_0$ is not available then an estimate of $\hat{b}_2$ can be obtained from the first difference equation $$\hat{b}_2 = \Delta \hat{d}_{2,1} = \Delta d_{2,1} + \Delta b_{2,1} + \Delta n_{2,1} \quad (31)$$
$$= b_2 + \Delta d_{2,1} - b_1 - n_1 + n_2$$

which is a biased estimate of $b_2$ with mean and variance given by $$E[\hat{b}_2] = b_2 + \Delta d_{2,1} - b_1 - n_1 \quad (32)$$

$$\text{var}[\hat{b}_2] = \text{var}[n_2] = \sigma_2^2 = \sigma_i^2 \quad (33)$$

where it was assumed in (32) that once $n_1$ occurs it is a constant offset to $\hat{b}_2$ and thus can be viewed as an unknown deterministic constant (since it doesn't change throughout the iterations). It is clear from (31) that if a good estimate of the initial offset $\theta = b_1$ and $\Delta d_{2,1}$ can be obtained then the bias can be estimated accurately. The bias estimate for the next time step can be similarly obtained using the recursive bias estimation equation given in (28)

$$\hat{b}_3 = \Delta \Delta \hat{d}_{3,2} + 2\hat{b}_2 - \hat{b}_1. \quad (34)$$

Using (25) and the expressions for the bias estimates $\hat{b}_2$ and $\hat{b}_1$ in (31) and (29), respectively, gives $$\hat{b}_3 = \Delta \hat{d}_{3,2} - \Delta \hat{d}_{2,1} + 2\hat{b}_2 - \hat{b}_1 \quad (35)$$
$$= (\Delta d_{3,2} - \Delta d_{2,1}) + (\Delta b_{3,2} - \Delta b_{2,1}) + (\Delta n_{3,2} - \Delta n_{2,1}) + 2(\Delta d_{2,1} + \Delta b_{2,1} + \Delta n_{2,1})$$

After some algebra and simplifications this becomes $$\hat{b}_3 = b_3 + \Delta d_{3,1} - b_1 - n_1 + n_3 \quad (36)$$

which is a similar expression we obtained for $\hat{b}_2$ and we can easily see that it is biased by $\Delta d_{3,1} - b_1 - n_1$ and its variance is $\sigma_3^2 = \sigma_i^2$. In fact if the recursive exercise is continued for the rest of the bias estimates a generic expression for the estimate can be obtained as $$\hat{b}_i = b_i + \Delta d_{i,1} - b_1 - n_1 + n_i \quad (37)$$

where the bias estimate is biased itself as $$E[\hat{b}_i] = b_i + \Delta d_{i,1} - b_1 - n_1 \quad (38)$$

and the variance of the bias estimate is $\text{var}[\hat{b}_i] = \text{var}[n_i] = \sigma_i^2$. It can be noted that the bias estimates obtained from the recursive relationship (37) are biased by a slow varying component and a constant offset due to the incorrect assumption that $b_1$ is zero. The example shown in FIG. 16 illustrates how these components skew and offset the bias estimates.

Figure 16:
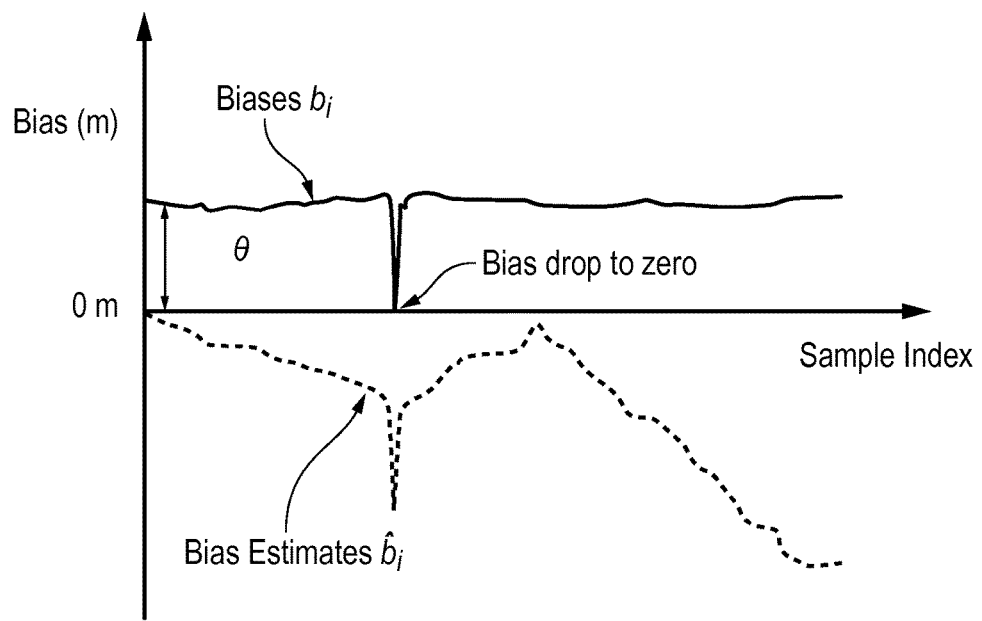
FIG. 16 shows the behaviour of biases estimated according to an embodiment of the present invention and the actual bias.

In the example of FIG. 16, the solid curve represents the true biases experienced; while the dashed line are the estimated biases obtained from (28). It is clear that the estimated biases are offset by the initial $\theta$ and skewed by $\Delta d_{i,1}$. Thus in order to obtain accurate bias estimates then $\Delta d_{i,1}$ and $\theta$ need to be estimated in order to recover the actual biases. One simple approach to estimate $\Delta d_{i,1}$ and $\theta$ is to pass the estimated biases through a minimum sliding window; where essentially the minimum of the window is retained at each sample index. The output of the minimum sliding window is then used to correct for the slowly varying $\Delta d_{i,1}$ and track bias transitions (drops) relative to the initial assumption of $b_1 = 0$. The maximum drop relative to the first bias assumption is then used to correct the offset $\theta$ and establish the new baseline.

In the example of FIG. 16, the single LOS sample that causes the actual bias to drop to zero (or near zero) will be used once it falls within the sliding window.

To illustrate the approach an example can be considered. In this example it is assumed that the user is ranging in an all NLOS scenario with the following bias statistics: exponential distributed, $\lambda = 1/8$ and $b_{min} = 5$. At three sample times, the user experiences LOS conditions with the following biases $b_{100} = 3$, $b_{300} = 1$ and $b_{500} = 0$. The estimated biases obtained using (28) are illustrated in FIG. 17.

Figures 17A, 17B:
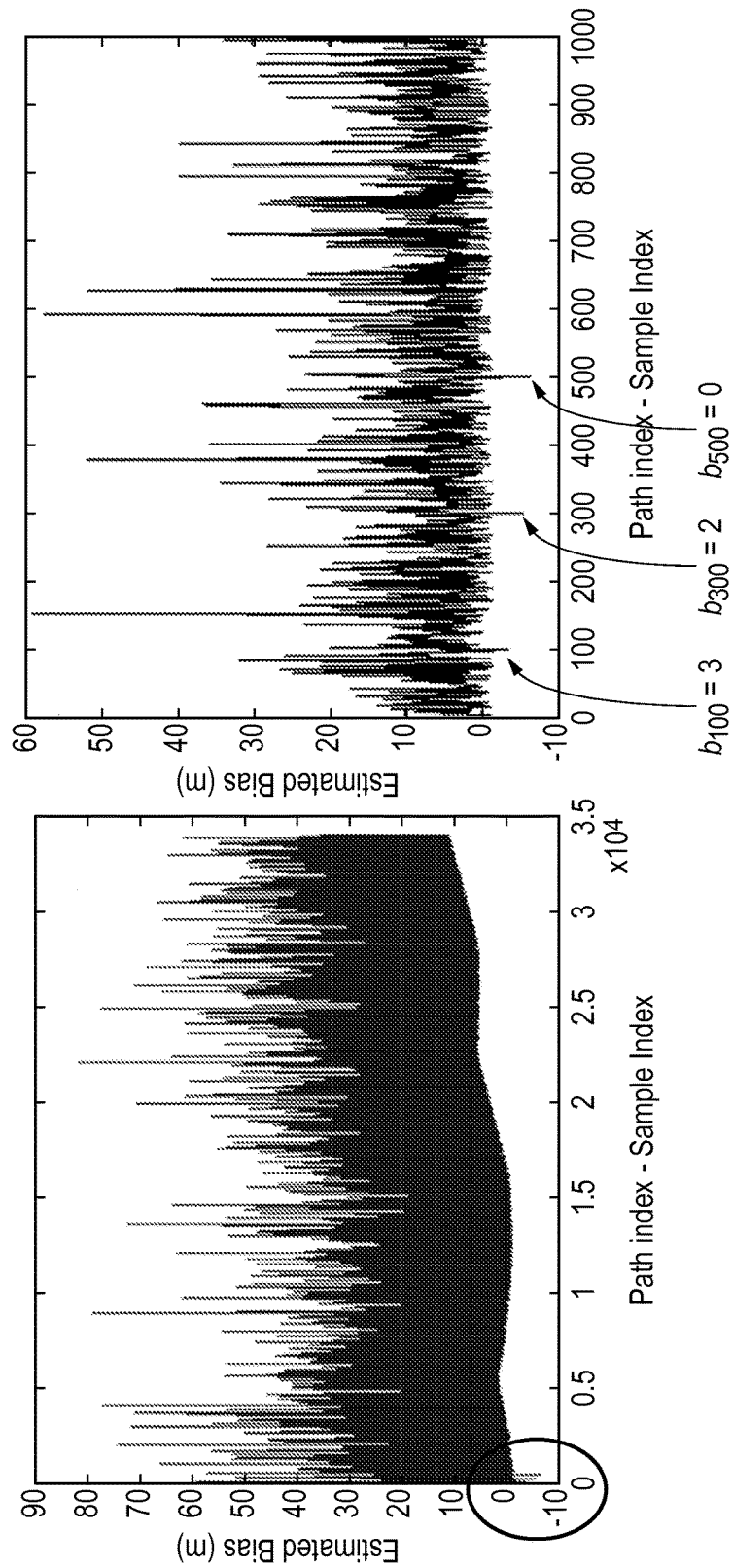
FIG. 17(a) shows the estimated biases obtained from an embodiment of the present invention in an example scenario and FIG. 17(b) is a close-up of the initial part of FIG. 17(a)

FIG. 17(a) shows the estimated bias obtained from (28). FIG. 17(b) is a close-up of the estimated biases focusing on the bias drops occurring at sample times 100, 300 and 500. This scenario deals with the most general case, where each bias sample can be a realization from a different channel condition. In simpler cases, a similar range of bias values can persist for several samples as the user is moving.

Figure 18:
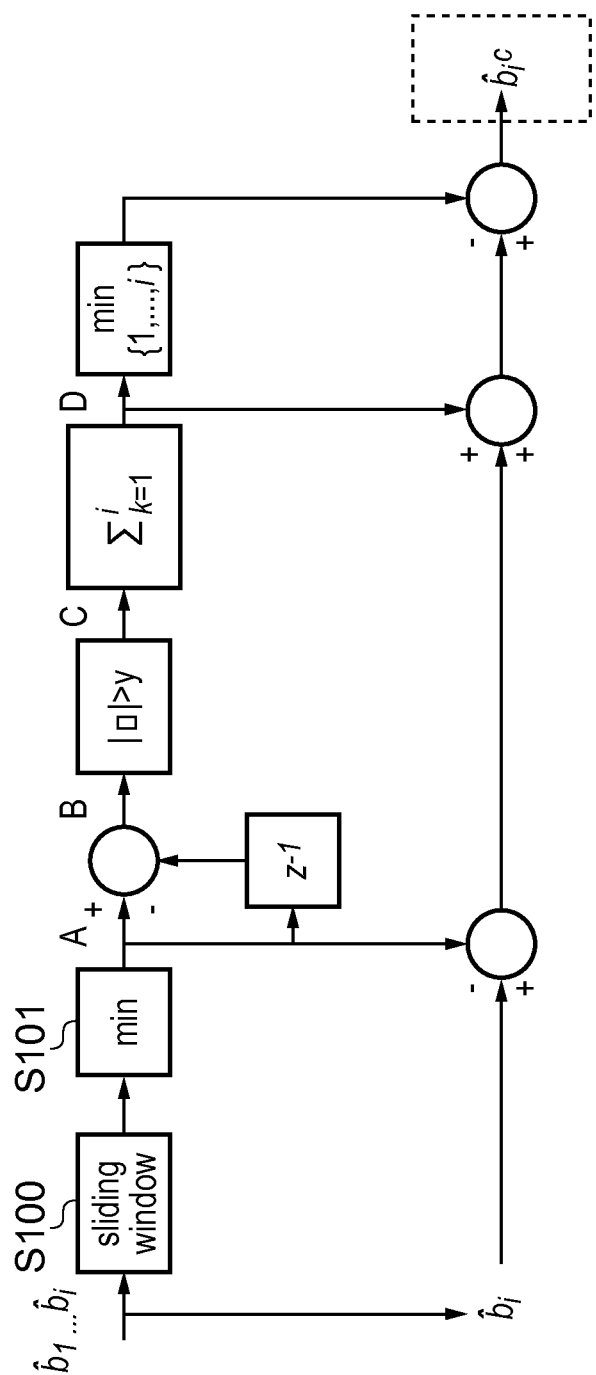
FIG. 18 shows a system diagram for the estimation and correction of estimated biases according to an embodiment of the present invention.

The system diagram in FIG. 18 illustrates the steps involved in correcting the bias estimates.

From (28) a sequence of bias estimates $\hat{b}_1 \ldots \hat{b}_i$ are obtained that are skewed with time and offset (relative to $b_1$), see (37) and FIG. 17. The objective is to obtain the corrected bias estimates (without the skew and the offset), $\hat{b}_1^c \ldots \hat{b}_i^c$. The bias estimates are first passed through a sliding window of length M, $w[i] = [\hat{b}_{i-M}, \hat{b}_{i-M+1}, \ldots, \hat{b}_i]^T$ (S100) and the minimum is selected from each window or $\kappa_i = \min\{w[i]\}$ (S101). The output at point A in FIG. 18 essentially tracks the minimum baseline and any shift in the baseline can be detected.

Figures 19A, 19B:
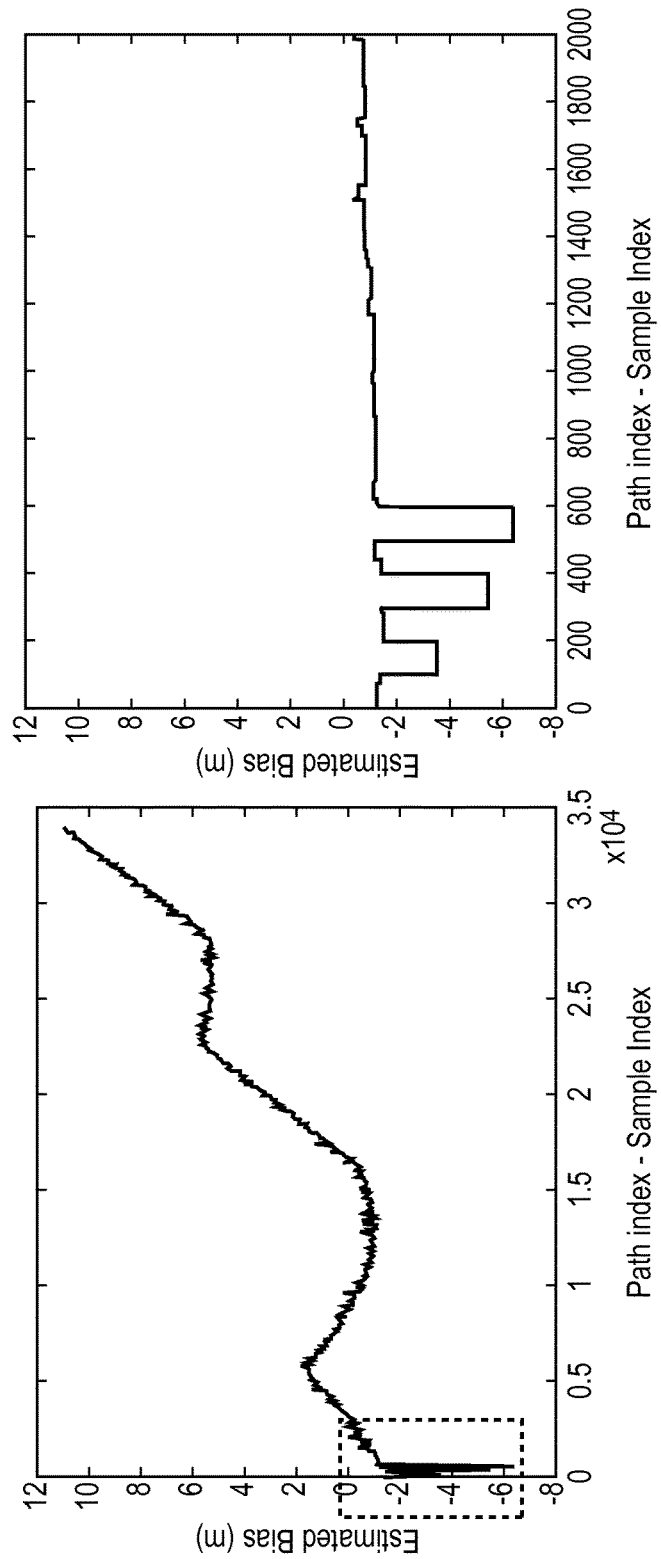
FIG. 19(a) shows the output at point A in the system shown in FIG. 18 as applied to the example scenario and FIG. 19(b) is a close-up of the initial part of FIG. 19(a)

FIG. 19 shows the tracking of the minimum baseline. FIG. 19(a) shows the output at point A in FIG. 18. FIG. 19(b) is a close-up view docusing on the bias drops at points 100, 300 and 500. If the baseline shift (the drops) occur once within a window, then the baseline persists for the duration of the window-length (in this example, M=100). If multiple bias drops occur then this results in a "staircase" of drops. The last bias drop in the window then persists until it is dropped out of the window.

It will be noted that the minimum baseline essentially is an estimate of $\Delta d_{i,1}$, except at locations where the bias drops occur. The impact of the bias drops then persists through the length of the window, until the sample is pushed out of the window.

Figures 20A, 20B:
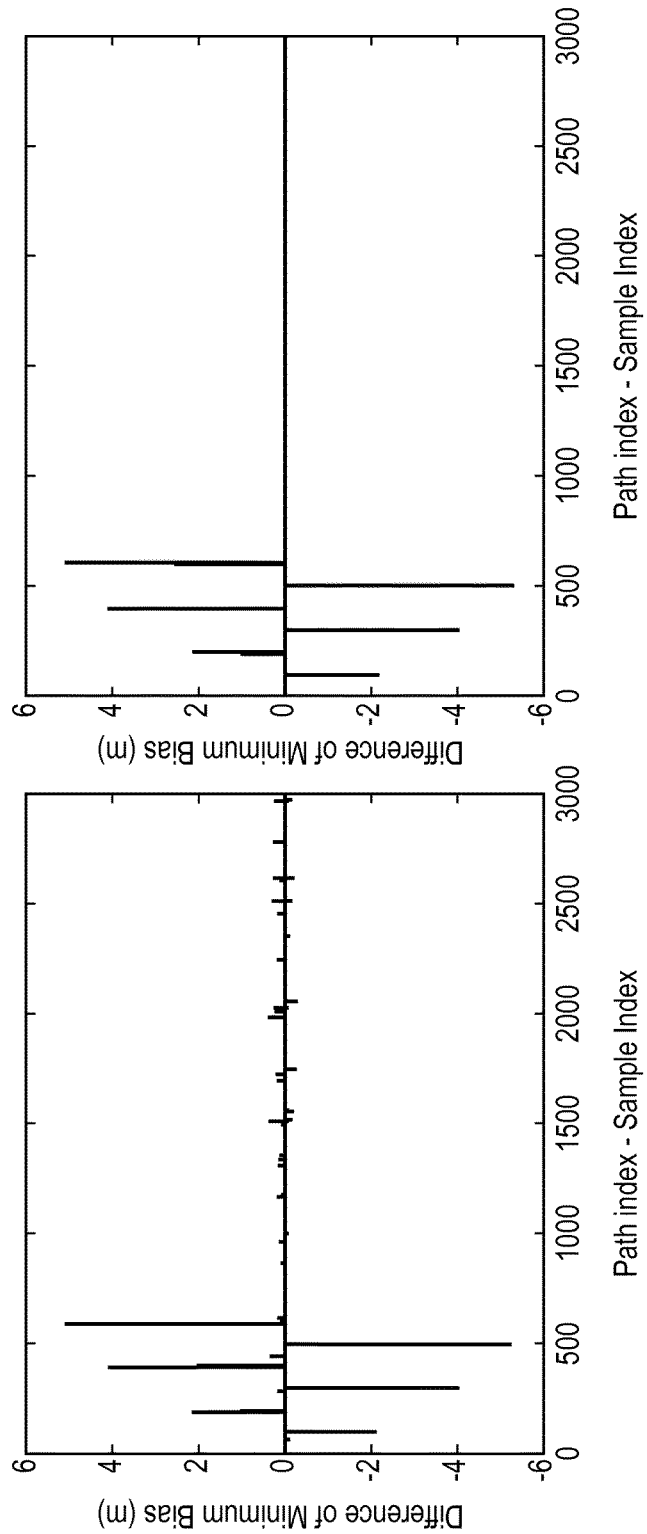
FIG. 20(a) shows the first difference of the recorded minimum values in the system shown in FIG. 18 as applied to the example scenario (point B in FIG. 18)
FIG. 20(b) shows the same differences once they have been subject to a thresholding filter (point C in FIG. 18)

Next, in order to estimate the bias transitions (drops), the first difference of the minimum values $\kappa_i$ is obtained (see FIG. 18 at point B)

$$\delta_i = \kappa_i - \kappa_{i-1} \qquad (39)$$

which is the first derivative of $\kappa_i$ and, as expected, it will result in impulses at the transition locations, as illustrated in FIG. 20(a). Since the aim is to track baseline shifts due to changes in biases (bias drops) then $\delta_i$ is filtered by applying a simple threshold to obtain a waveform of impulses, $\delta_i^p$ $$\delta_i^p = \begin{cases} \delta_i, & |\delta_i| > \gamma \\ 0, & \text{else} \end{cases} \qquad (40)$$

where $\gamma > 0$ is a threshold that should be related to the intensity of the measurement noise, $\text{var}[n_i]$. The thresholding is used to avoid detecting noise changes as bias transitions. The filtered pulses are illustrated in FIG. 20(b).

In order to remove the impact of the windowed response to the transitions, the waveform created as a result of the windowing has to be recreated. If the train of impulses (FIG. 20(b)) is passed through a running sum, then a waveform is obtained that is the same as that obtained from the transitions: compare FIG. 19(b) and FIG. 21(a), where the latter is the output of the running sum (point D in FIG. 18).

The final step is to track the absolute minimum bias drop. This can be achieved by passing the sum of the train of impulses, $\delta_i^p$, through a running minimum function or $$\hat{\theta}_i = \min\left(\sum_{k=1}^{i} \delta_k^p\right). \qquad (41)$$

Note that $\hat{\theta}_i$ is a running estimate of $\theta$; that is if the channel condition improves with time and better LOS conditions occur, then the $\hat{\theta}_i$ estimate will converge to $\theta$, or as $b_i \to 0$, then $\hat{\theta}_i \to 0$. This is illustrated in FIG. 21(b) where the minimum baseline is tracked throughout the measurements and drops to a minimum when a zero bias is experienced. Thus if the initial assumption of 0 bias was not true, then the offset can be recursively corrected. Finally it is clear from the figures and the illustrative examples that simple addition and subtraction of the estimated sequences can provide a very accurate corrected bias estimate in real-time which can be summarized as $$\hat{b}_i^c = \hat{b}_i - \kappa_i + \sum_{k=1}^{i} \delta_k^p - \hat{\theta}_i. \qquad (42)$$

Figures 22A, 22B:
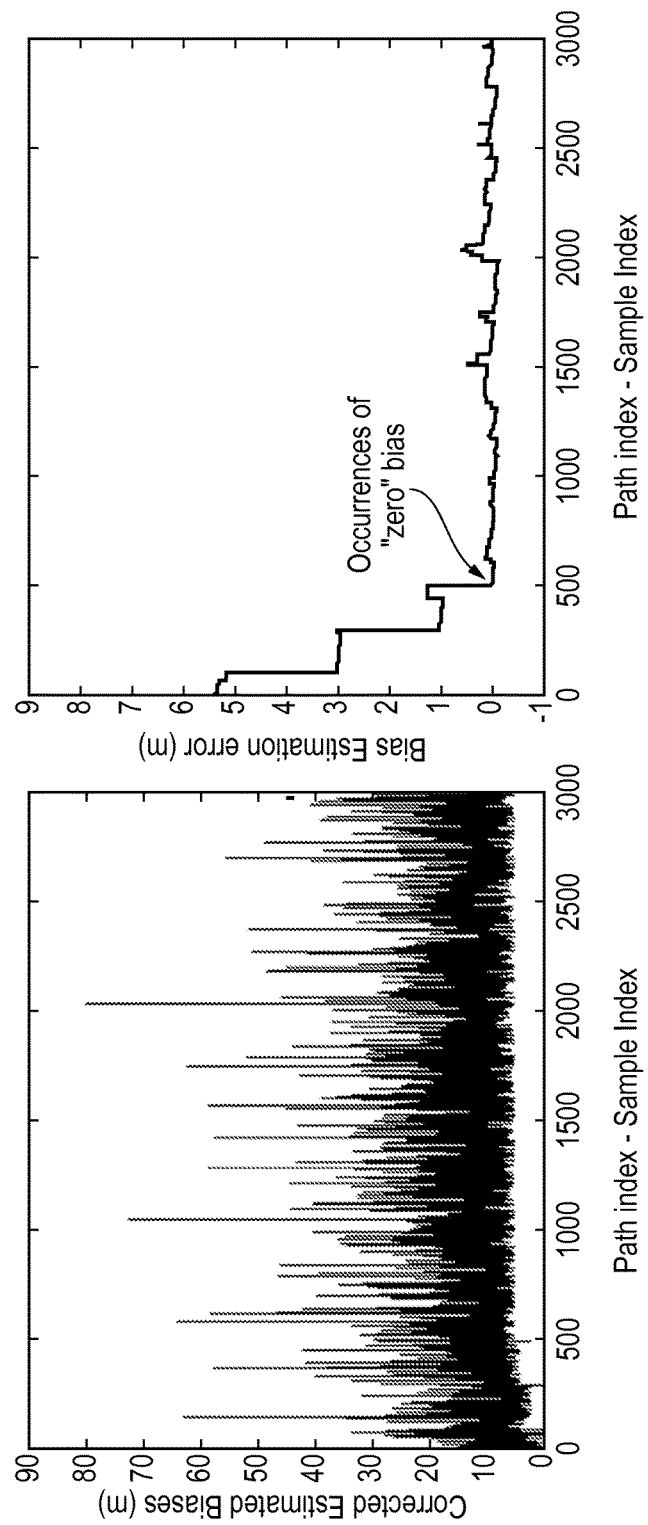
FIG. 22(a) shows the corrected bias estimates produced by the system of FIG. 18 as applied to the example scenario and FIG. 22(b) shows the bias estimation error in those corrected bias estimates.

In the example, once the minimum baseline at i=500 occurs then the bias estimates converge to the true value and thus range measurements can be corrected providing very accurate measurements to the EKF block. FIG. 22 illustrates the final corrected biases (FIG. 22(a)) and the bias estimation error $\varepsilon_i = b_i - \hat{b}_i^c$ (FIG. 22(b)).

It is clear from FIG. 22(b) that the error in bias estimation converges to zero after the 500$^{th}$ sample.

Figure 23:
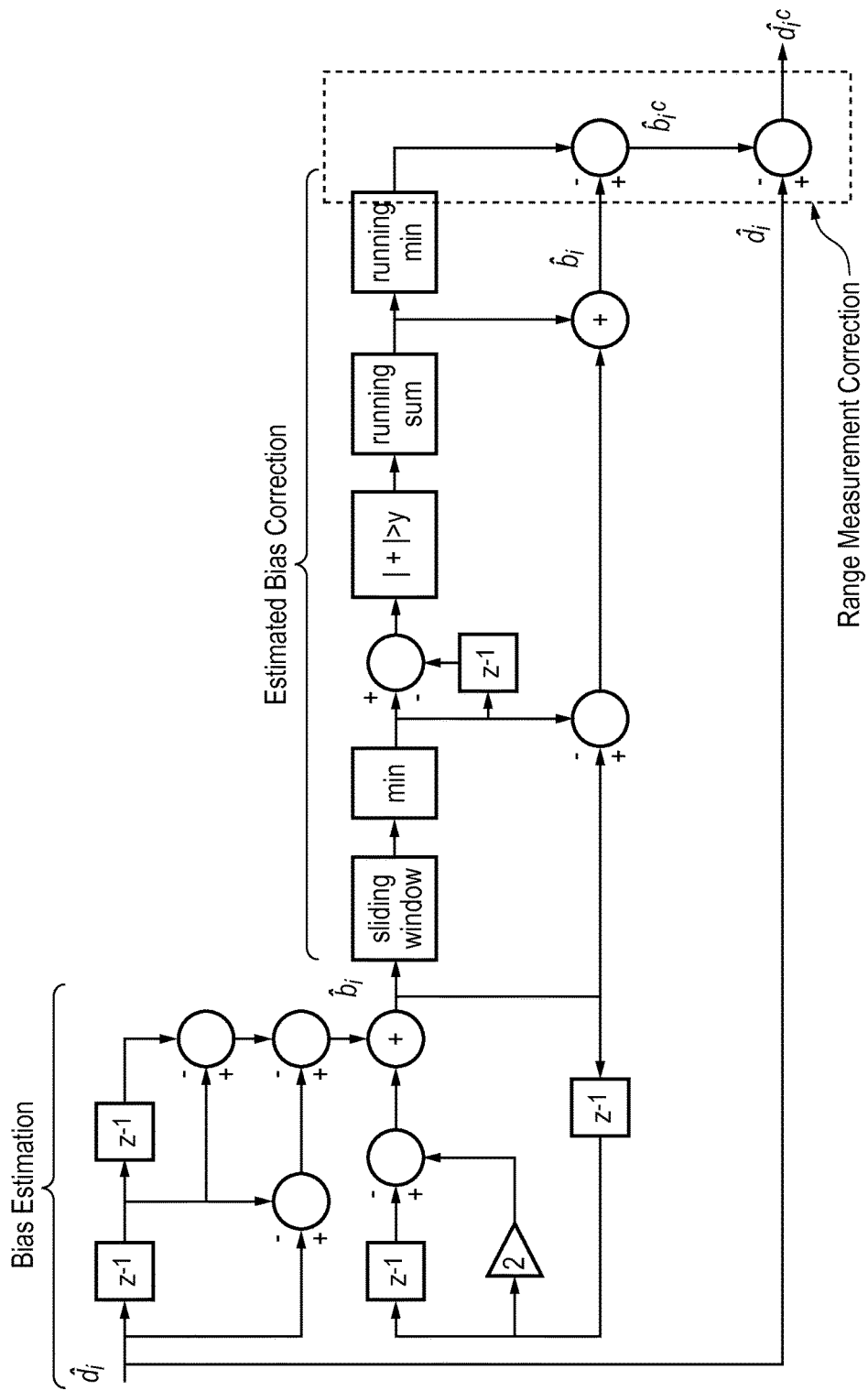
FIG. 23 shows a system diagram for the combined bias estimation and correction system according to an embodiment of the present invention, along with the range measurement correction step.

FIG. 23, illustrates the overall system diagram of bias estimation and range measurement corrections according to an embodiment of the present invention.

Equipped with the final bias estimates, it is then possible to correct the corrupted range measurements as $$\hat{d}_i^c = \hat{d}_i - \hat{b}_i^c. \qquad (43)$$

Essentially the process to unbias the range measurements involves first estimating an accurate estimate of the biases and then subtracting them from the range measurements. The measurements will be biased by the lowest experienced bias. The corrected measurements will still be corrupted by noise and some minor bias (due to imperfect estimation and noise in the system) but this can be easily handled by a suitably designed EKF. The bias estimation and correction approach of the above embodiments can be viewed from an optimization view point as well. Since the object is to obtain the minimum of all the range measurements (correct the biases) then it is possible to employ a convex hull (linear programming) approach to provide corrected range measurements [16].

In the next section some numerical examples will be provided to illustrate the ability of embodiments of the present invention to estimate the biases and correct the range measurements in an EKF framework.

Tracking with Bias Correction—Numerical Examples

Embodiments of the present invention have been set out above and have illustrated how the estimates of the biases can be obtained with accuracy related to the best experienced channel condition while moving in a multipath environment.

To demonstrate the functioning of these embodiments, localization and tracking performance is now presented for two examples.

In the first example, the MD is moving indoors in an all NLOS ranging condition with exponential bias statistics with $\lambda_{NLOS}$ and $b_{min}=5$, that is the lowest bias experienced is 5 meters. Then at three specific sample times, the user experiences range measurements with smaller biases (indicating channel improvements). The three bias values are 3, 1 and 0 meters and they occur for the BSs at the following sample times BS1: 100, 2000 and 4000
BS2: 500, 2500 and 4500
BS3: 1000, 3000 and 5000
BS4: 1500, 3500 and 5500

Figure 24:
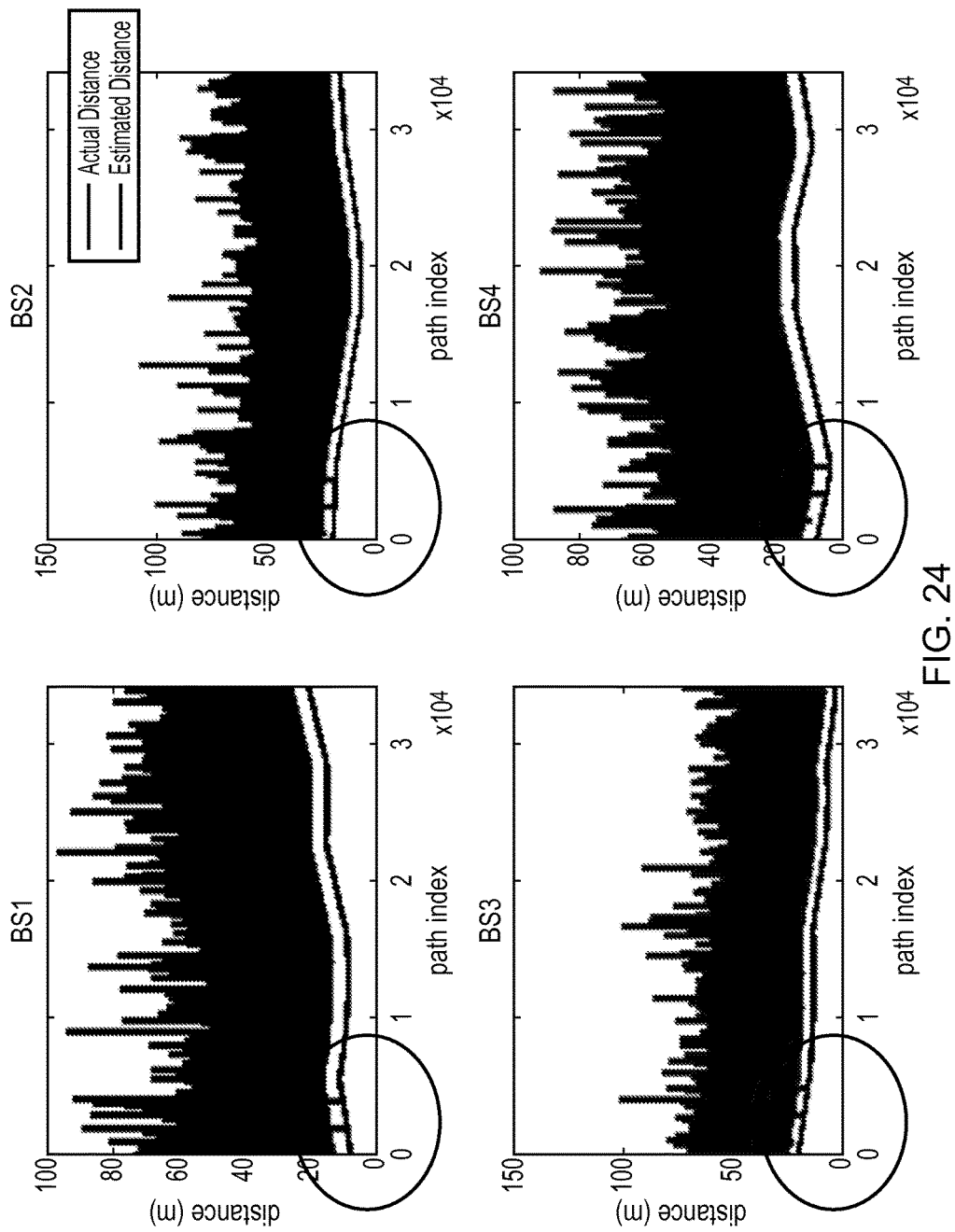
FIG. 24 shows the actual and measured distances between a mobile device and four base stations in a further example before bias correction is applied.

The example is similar to that introduced in the previous section, but it is more general since we are examining the bias drops experienced across all the BSs and how the proposed invention can be implemented in a KF framework to improve the accuracy of the tracking FIG. 24 illustrates the actual (lower line) and measured range (upper line—sampled) from the MD to the BS.

Figure 6A:
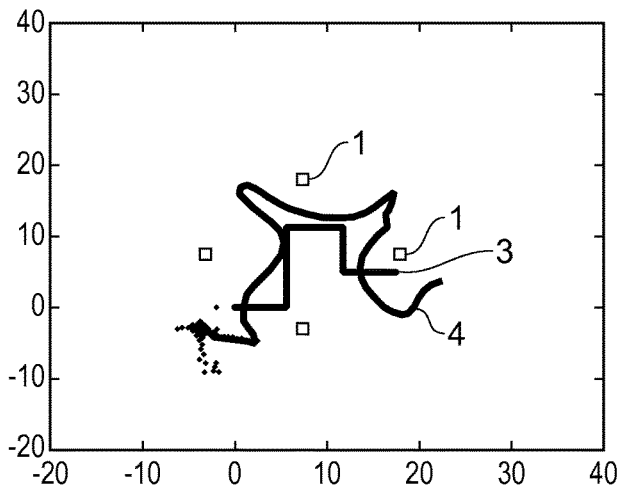
FIGS. 6a, 6b and 6c show the performance of an indoor localization method for a WiFi system in respectively LOS, NLOS and severe NLOS conditions.
Figure 6B:
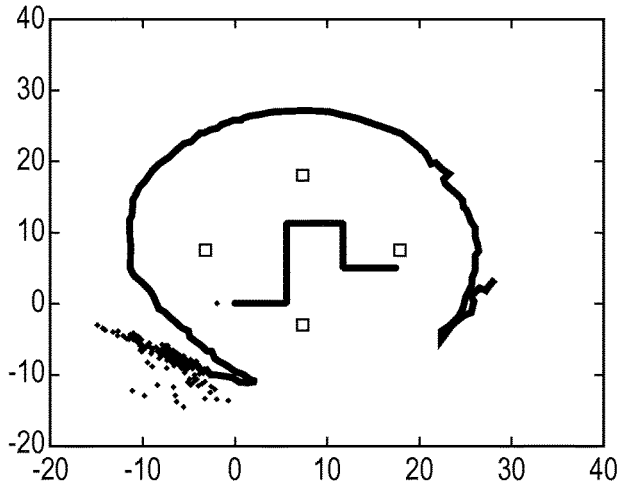
Figure 6C:
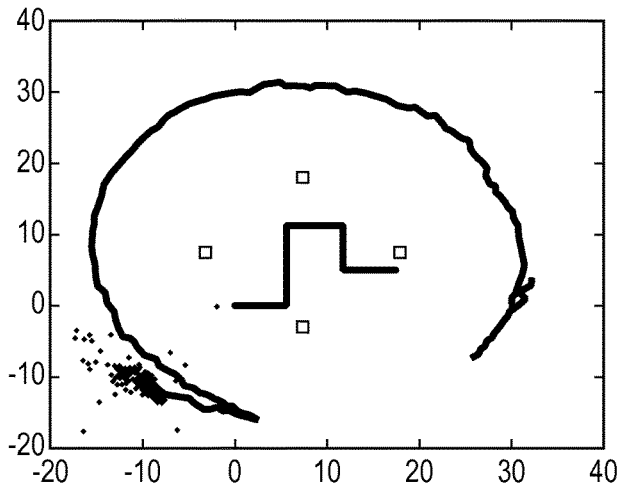
Figure 7A:
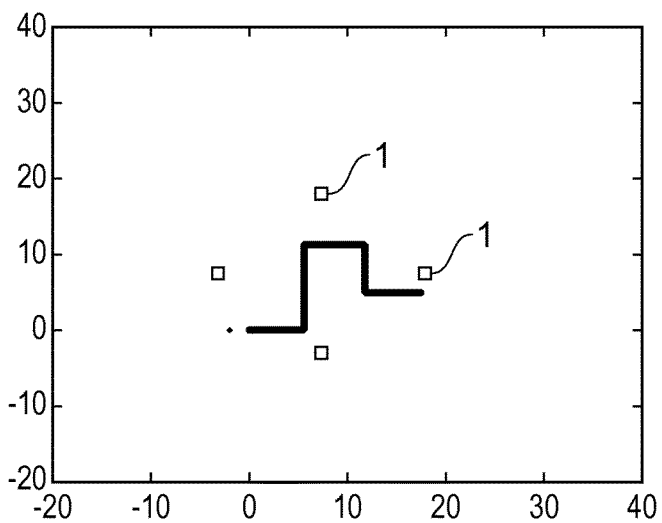
FIGS. 7a, 7b and 7c show the performance of an indoor localization method for a UWB system in respectively LOS, NLOS and severe NLOS conditions.
Figure 7B:
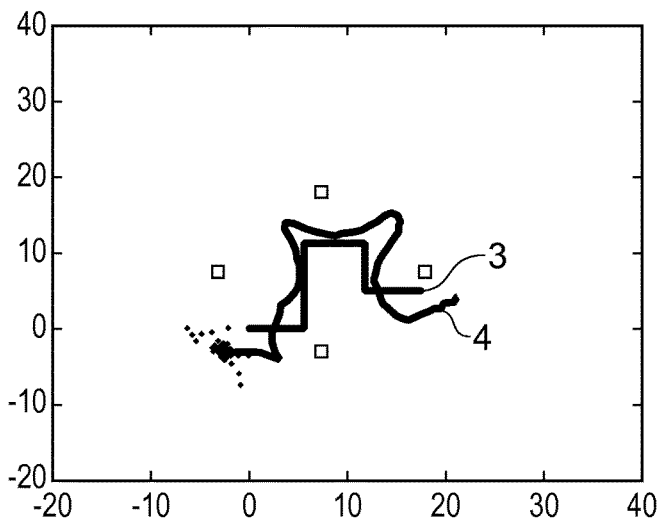
Figure 7C:
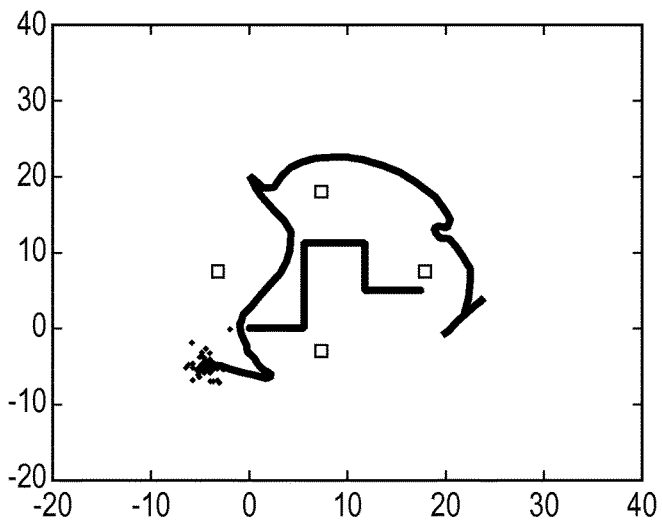
Figure 25A:
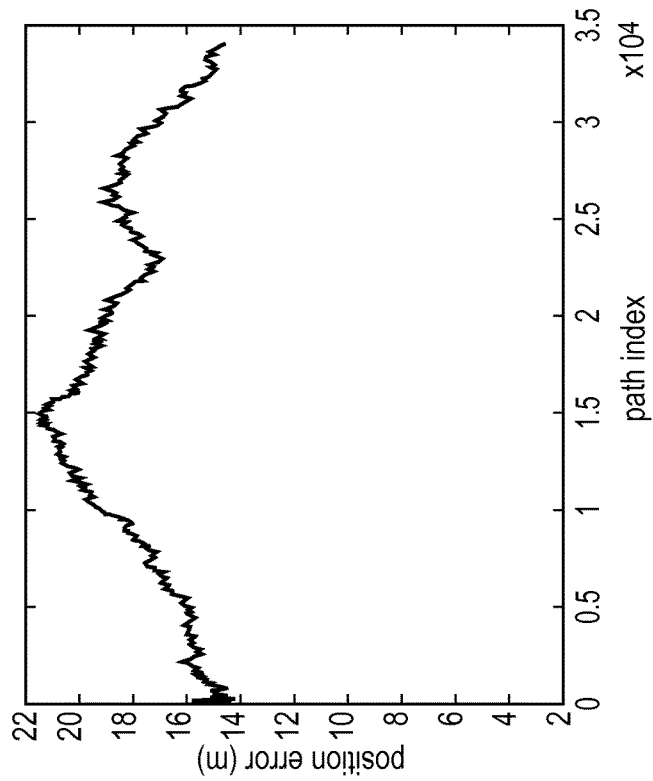
FIG. 25(a) shows the localization and tracking performance in the example of FIG. 24 before bias correction is applied and FIG. 25(b) shows the absolute positioning error.
Figure 25B:
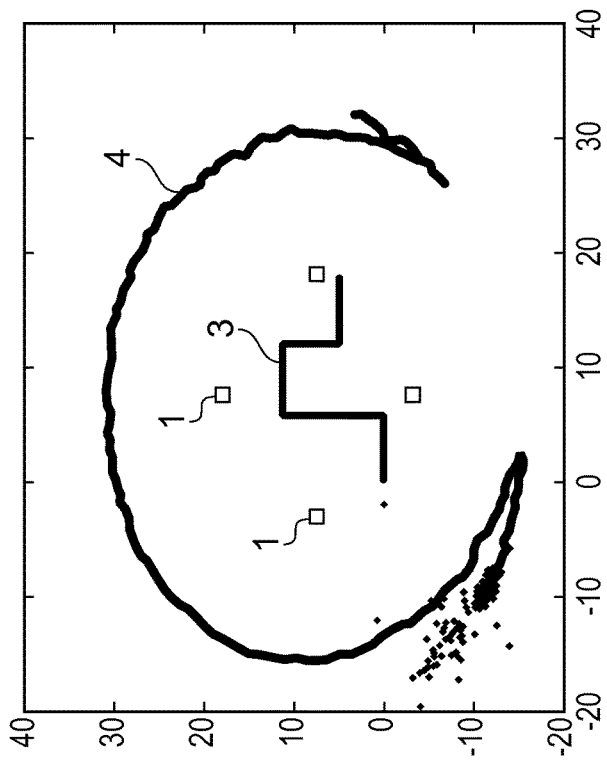

Note that the lower curve in the four figures is the evolution of the actual distance between the MD and the respective BS; while the highly variable curve is the estimated distance (distance plus NLOS bias). The three bias drops appear as spikes (in the highlighted region of each graph) with the last one touching the actual distance curve since the bias is zero. The tracking performance without any bias correction is illustrated in FIG. 25 which uses a similar actual track 3 to FIGS. 6 and 7 described above. FIG. 25(a) shows the actual track 3 and the measured track 4 as well as the positions of the BS 1. FIG. 26(b) shows the position error as the mobile device moves along the track 3.

Since the statistics of the NLOS bias are severe the tracking performance is very poor. The range measurements provide almost useless information to the EKF and thus the performance is degraded significantly. An average positioning error of 18 meters can be seen in FIG. 25(b).

In contrast, FIG. 26 illustrates the tracking performance for the same track 3 of the mobile device using the proposed bias correction technique of the above embodiments prior to the EKF. FIG. 26(a) demonstrates that the estimated track 4 quickly converges to the actual track 3 and the localization estimate converges to the true location as soon as the bias drops occur. FIG. 26(b) shows the position error as before and after the final bias drop occurring at 5500, the localization estimate converges due to very accurate bias estimates that are fed to the EKF. From a comparison of FIGS. 25 and 26 it will be seen that the performance is significantly better than localization and tracking with no bias correction.

Figures 27A, 27B:
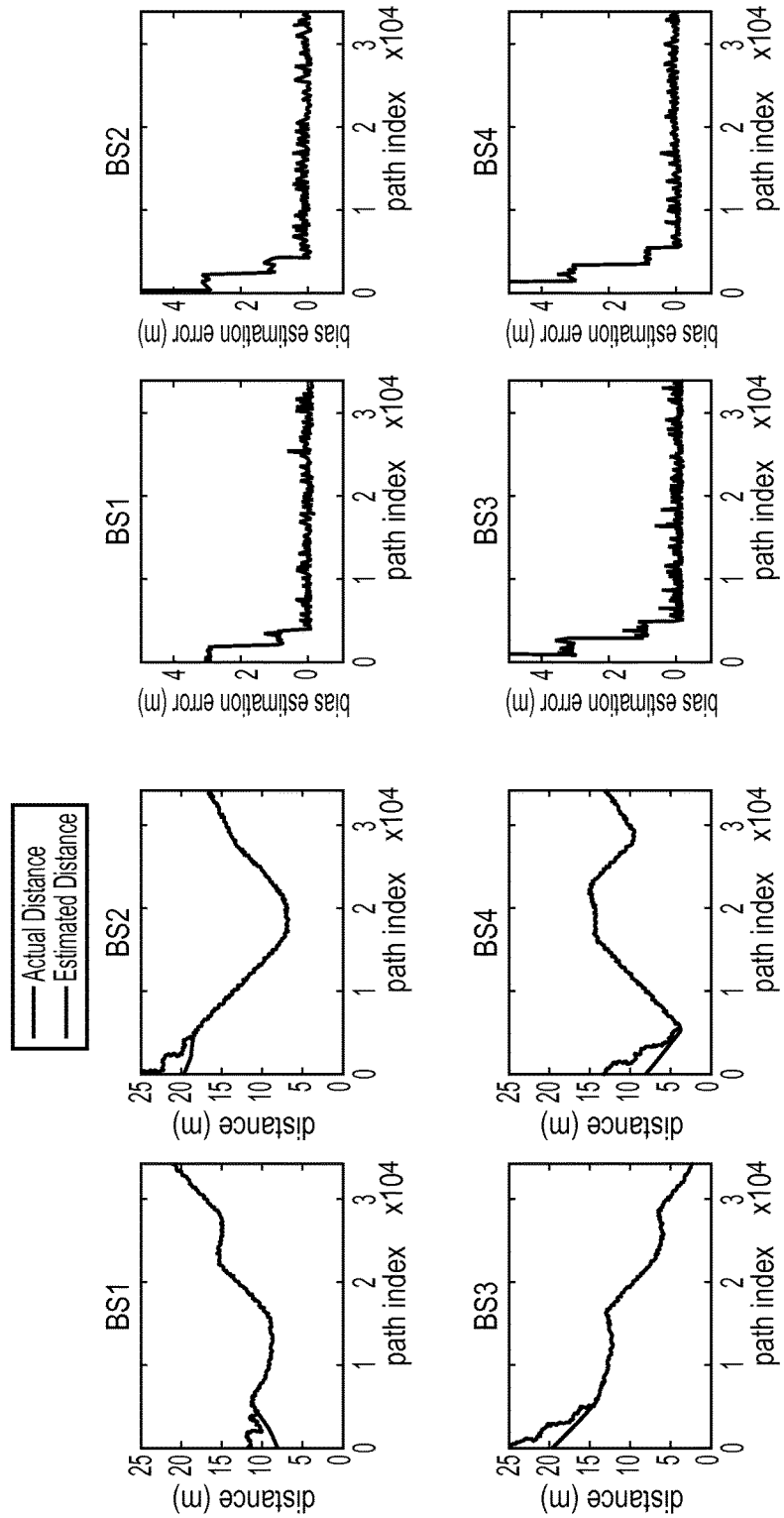
FIG. 27(a) shows the actual and measured distances in the system once bias correction according to an embodiment of the present invention is applied and FIG. 27(b) shows the bias estimation error.

FIG. 27 illustrates the impact of the bias correction algorithm on the estimated range (FIG. 27(a)) and the bias estimation error (FIG. 27(b)) to each BS.

Specifically, FIG. 27(a) illustrates the actual distance evolution and the estimated distance. Note that even before the bias drops, the technique locks on the best bias (which is around 5 meters—since it is the minimum bias that can be experienced statistically). Then once the bias drops occur, the corrected range measurements converge to the true distance and thus improve the localization significantly. This is also illustrated in FIG. 27(b) where the bias estimation error converges to zero. Although there are variations in the measurements due to noise, these can be easily handled by the EKF with proper design of the process and noise covariances.

The second example illustrates the potential of the bias correction algorithm when the initial measurements are actually zero bias; which ensures accurate bias estimation from the beginning. This is particularly useful for firefighter localization and tracking applications, in which the firefighters with mobile radios enter a burning building and it is desirable to track them with high accuracy in order to ensure their safety and coordinate rescue operations. Since the firefighters (and their mobile devices) are going from a LOS into a NLOS then it is possible to calibrate the mobile radios prior to entering the building. By calibrate we mean lock the mobile radios to zero bias conditions, so that any subsequent increase in bias can be estimated and corrected accurately.

Figure 28A:
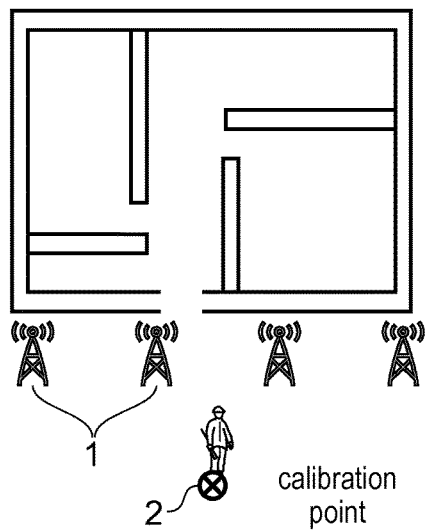
FIGS. 28(a) and (b) show a further embodiment of a bias correction and tracking method according to an embodiment of the present invention.
Figure 28B:
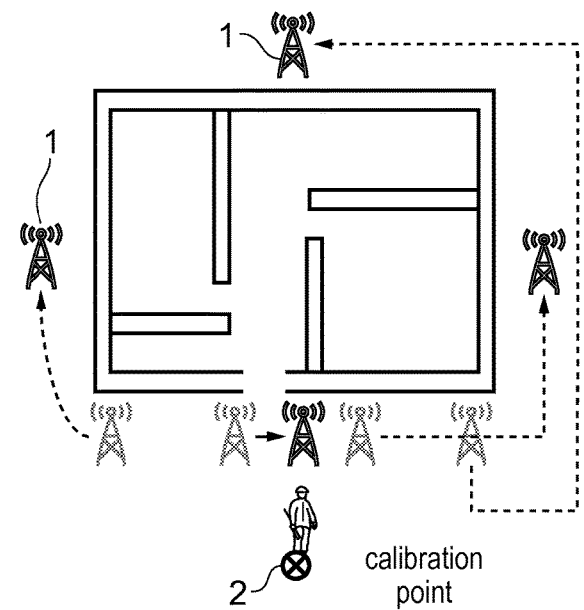
FIG. 28(b) shows the re-positioning of the base stations to provide the required coverage.

An example layout is shown in FIG. 28. The firefighter localization application usually involves a set of mobile BSs 1 that are deployed on the scene instantaneously. So prior to final deployment the mobile BSs 1 are first congregated close to the firefighters to calibrate the initial biases between the BSs 1 and the MDs 23 carried by the firefighters. This can be achieved by knowing the exact distance between the firefighter's mobile device 2 and the BSs 1; through laser tags, GPS, etc. Once a zero bias initial condition is established then the mobile BSs 1 are deployed to the desired location which is usually required to ensure proper coverage and system optimization, for example as shown in FIG. 28(b).

Figure 29:
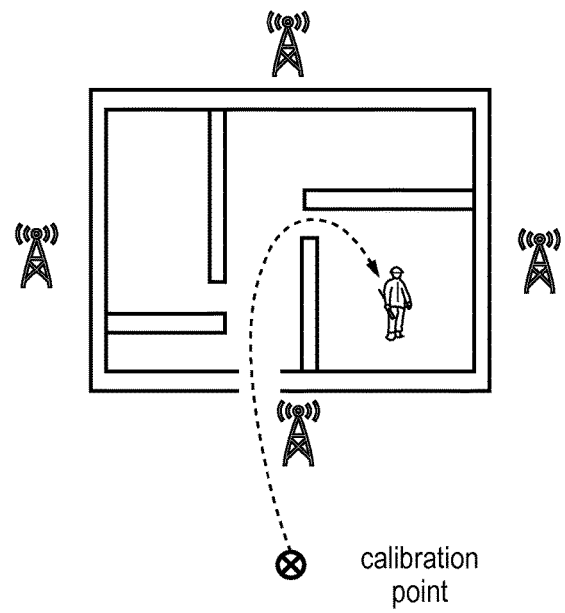
FIG. 29 shows the next step in the embodiment of FIGS. 28(a) and (b) in which the mobile device has enters the building and can be accurately tracked.

As the mobile BSs 1 are moving to their location, the proposed bias estimation and correction technique can maintain the initial baseline. Finally, once the base stations are in place, the firefighter starts moving and enters the building, as illustrated in FIG. 29. With the proposed bias estimation and correction technique it is then possible to continuously correct the corrupted range measurements and enable very accurate and precise localization and tracking performance.

Figures 31A, 31B:
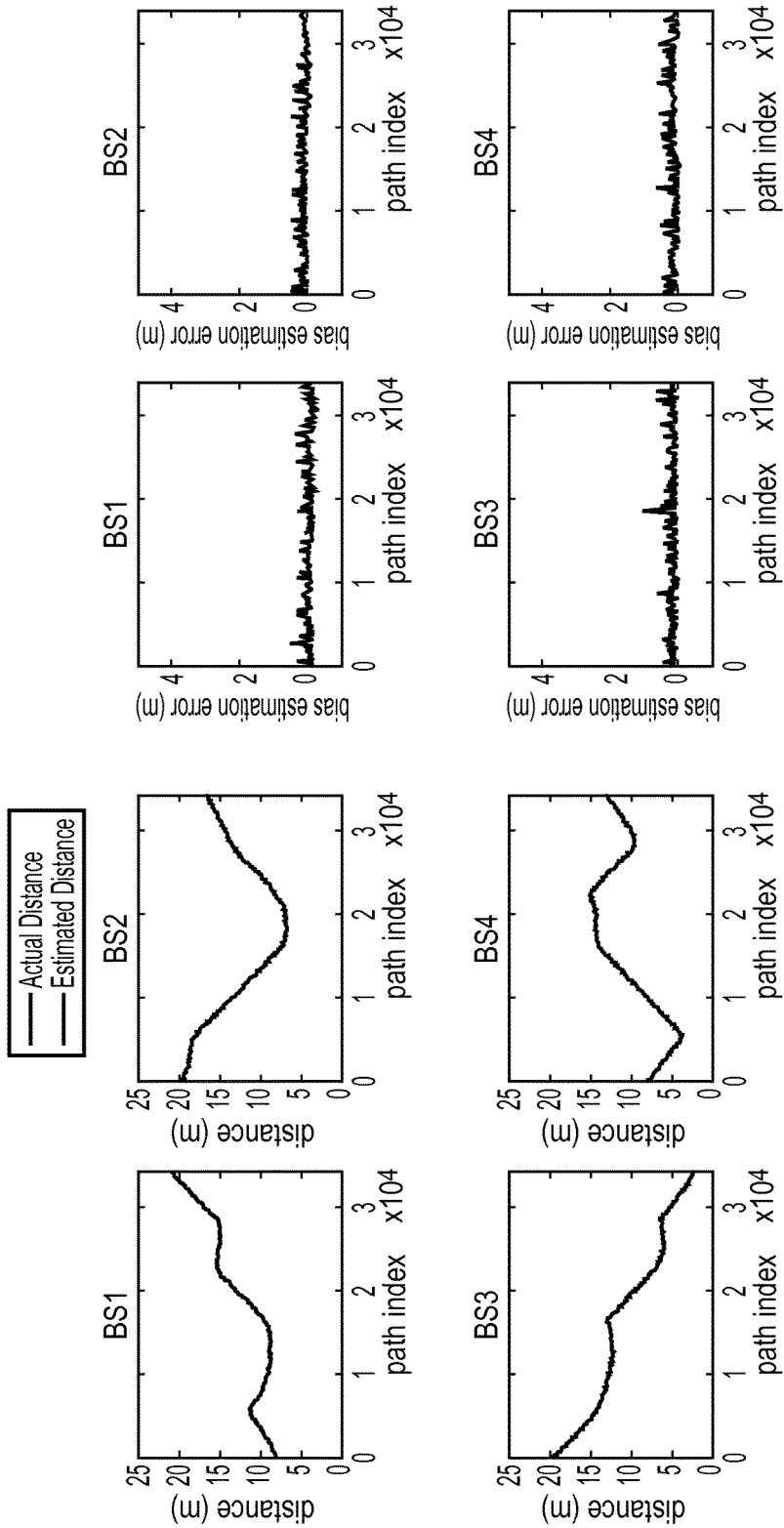
FIG. 31(a) shows the actual and estimated distances between the mobile device and the 4 base stations in the embodiment shown in FIGS. 28 and 29 and FIG. 31(b) shows the bias estimation error in the estimated distances.

FIGS. 30 and 31 illustrate the localization and tracking performance with an initial baseline of zero; obtained from the zero bias calibration. FIG. 30(a) shows the near perfect match between the actual track 3 and the predicted track 4 with a zero initial bias. FIG. 30(b) shows the positioning error with a zero initial bias. FIG. 31(a) shows the actual and estimated distances to each base station 1 after applying the bias correction technique with zero bias calibration and FIG. 31(b) shows the bias estimation error to each base station 1.

The numerical examples in this section highlight the robustness and accuracy of the embodiments of the present invention under different applications and scenarios. In particular, these embodiments can dynamically and recursively reduce the bias error and pass the corrected measurements to the EKF. The simulation results tested highlight the more rigorous scenarios where the biases are significant and fluctuate with high frequency at each measurement sample.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1] I. Guvenc and C.-C. Chong, "A survey on TOA based wireless localization and NLOS mitigation techniques," IEEE Commun. Surveys and Tutorials, vol. 11, no. 3, pp. 107-124, 3rd Quarter 2009.

[2] M. Najar, J. M. Huerta, J. Vidal and J. A. Castro, "Mobile location with bias tracking in non-line-of-sight" in Proc. IEEE Int'l Conf. on Acoustic, Speech and Signal Processing, vol. 3, pp. 956-959, May 2004.

[3] S. Mazuelas, F. A. Lago, J. Blas, A. Bahillo, P. Fernandez, R. M. Lorenzo and E. J. Abril, "Prior NLOS measurement correction for positioning in cellular wireless networks", IEEE Trans. on Vehicular Technology, vol. 58, no. 5, pp. 2585-2591, June 2009.

[4] J. Youssef, B. Denis, C. Godin and S. Lesecq, "Enhanced UWB indoor tracking through NLOS TOA biases estimation," in Proc. IEEE Global Telecommunications Conference (GLOBECOMM), pp. 1-5, December 2008.

[5] K. Yu, "Improved kalman filtering algorithms for mobile tracking in NLOS scenarios", in Proc. IEEE Wireless Commun. and Net. Conf. (WCNC), pp. 2390-2394, April 2012.

[6] H. R. You, J. J. Caffery, S. Vekatramen and S. Al-Jazzer (2006), Method for correcting NLOS error in wireless positioning system, U.S. Pat. No. 7,065,368.

[7] W. Ke and L. Wu, "Mobile location with NLOS identification and mitigation based on modified Kalman filtering", Sensors, vol. 11, pp. 1641-1656, 2011.

[8] H. Tang, Y. Park and T. Qiu, "NLOS mitigation for TOA location based on a modified deterministic model", Research Letters in Signal Processing, vol. 2008, ID 970461, 2008.

[9] C.-D. Wann and C.-S. Hsueh, "NLOS mitigation with biased Kalman filters for range estimation in UWB systems", in Proc. IEEE TENCON, pp. 1-4, October 2007.

[10] Z. Deng, Y. Yu, W. Guan and L. He, "NLOS error mitigation based on modified Kalman filter for mobile location in cellular networks", in Proc. Int'l Conf. on Wireless Commun. and Signal Processing (WCSP), pp. 1-5, October 2010.

[11] S. A. Golden and S. S. Bateman, "Sensor measurements for Wi-Fi location with emphasis on time-of-arrival ranging," IEEE Trans. on Mobile Computing, vol. 6, no. 10, pp. 1185-1198, October 2007.

[12] LAN/MAN Standards Committee of the IEEE Computer Society. IEEE P802.11vTM/D7.0 Draft standard for information technology-Telecommunications and information exchange between systems—Local and metropolitan area networks—Specific requirements—Part 11: wireless LAN MAC and PHY specification amendment 8: Wireless network Management, July 2009.

[13] IEEE Std P802.1AS/D7.0, Draft Standard for Local and Metropolitan Area Networks Timing and Synchronization for Time-Sensitive Applications in Bridged Local Area Networks, March 2010.

[14] Y. Bar-Shalom, X. R. Li, and T. Kirubarajan, Estimation with Applications to Tracking and Navigation, New York: John Wiley & Sons, 2001.

[15] N. Alsindi, B. Alavi, K. Pahlavan, "Measurement and modeling of Ultra Wideband TOA-based ranging in indoor multipath environments," IEEE Transactions on Vehicular Technology, pp. 1046-1058, vol. 58, no. 3, March 2009.

[16] L. Zhang, Z. Liu and C. H. Xia, "Clock synchronization algorithms for network measurements", in Proc. IEEE INFOCOM, vol. 1, pp. 160-169, 2002.

All references referred to above are hereby incorporated by reference.

The invention claimed is:

1. A method of estimating the position of a mobile device in relation to a base station, the method including the steps of:

receiving, in the mobile device, a ranging packet from the base station wherein the ranging packet comprises a hardware timestamp;

estimating, from said ranging packet, the distance of the mobile device from the base station;

recursively estimating, from said estimated distances and the changes between differences of said estimated distances, the bias experienced in each of said estimates;

correcting uncorrected distance estimations to take account of the estimated bias in each of said uncorrected estimations; and estimating the position of the mobile device from said corrected distance estimations, wherein the bias estimate $\hat{b}_i$ for the bias at time i is estimated using the recursive equation:

$$\hat{b}_i = \Delta\Delta \hat{d}_{i,i-1} + 2\hat{b}_{i-1} - \hat{b}_{i-2}$$

wherein $\Delta\Delta \hat{d}_{i,i-1}$ is the second difference in the estimate of the distance between the mobile device and the base station between the times i and i−1.

2. A method according to claim 1 wherein the recursive estimation of bias and the determination of the minimum bias are performed substantially in real time.

3. A method according to claim 1, further including the step of generating a position track history based on a plurality of estimated positions.

4. A method of estimating the position of a mobile device in relation to a base station, the method including the steps of:

receiving, in the mobile device, a ranging packet from the base station wherein the ranging packet comprises a hardware timestamp;

estimating, from said ranging packet, the distance of the mobile device from the base station; and recursively estimating, from said estimated distances and the changes between differences of said estimated distances, the bias experienced in each of said estimates;

correcting uncorrected distance estimations to take account of the estimated bias in each of said uncorrected estimations; and estimating the position of the mobile device from said corrected distance estimations, wherein the method further includes the steps of:

determining the minimum of said estimated biases within a selected time period; and updating said estimated biases using said determined minimum bias.

5. A method according to claim 4, further including the steps of:

determining the absolute minimum bias of all said minimum biases across all time periods; and updating said estimated biases using the absolute minimum bias.

6. A method according to claim 5, wherein the step of determining the absolute minimum of said estimated biases includes the steps of:
identifying decreases in the estimated bias between successive estimations; and
filtering said decreases to identify decreases which are more than a predetermined threshold.

7. A method according to claim 5, wherein the step of determining the absolute minimum bias further includes the steps of:
calculating a running sum of the differences between minimum bias values in subsequent time periods; and
identifying the absolute minimum bias as the minimum of said running sum.

8. A method according to claim 5, wherein the step of estimating the biases using the minimum and absolute minimum bias calculates the corrected bias estimate $\hat{b}_i^c$ at time i as:

$$\hat{b}_i^c = \hat{b}_i - \kappa_i + \Sigma_{k=1}^i \delta_k^p - \hat{\theta}_i$$

wherein $\hat{b}_i$ is the bias estimate for the bias at time i, $\kappa_i$ is the minimum value of $\hat{b}_i$ within the selected time period, $\delta_i$ is the first difference of the minimum values $\kappa_i$ ($\delta_i = \kappa_i - \kappa_{i-1}$), $\delta_i^p$ is $\delta_i$ to which a threshold filter has been applied and $\hat{\theta}_i$ is a running estimate of $\theta$, the initial offset in the recursive bias estimation and is calculated as $$\hat{\theta}_i = \min\left(\sum_{k=1}^i \delta_k^p\right).$$

9. A method according to claim 4, further including the step of generating a position track history based on a plurality of estimated positions.

10. A method of estimating a position of a mobile device in relation to a base station, the method including the steps of:
receiving, in the mobile device, a ranging packet from the base station wherein the ranging packet comprises a hardware timestamp;
estimating, from said ranging packet, the distance of the mobile device from the base station;
recursively estimating, from said estimated distances and the changes between differences of said estimated distances, the bias experienced in each of said estimates;
correcting uncorrected distance estimations to take account of the estimated bias in each of said uncorrected estimations; and
estimating the position of the mobile device from said corrected distance estimations.

11. A method according to claim 10 wherein the bias estimate $\hat{b}_i$ for the bias at time i is estimated using the recursive equation:

$$\hat{b}_i = \Delta\Delta\hat{d}_{i,i-1} + 2\hat{b}_{i-1} - \hat{b}_{i-2}$$

wherein $\Delta\Delta\hat{d}_{i,i-1}$ is the second difference in the estimate of the distance between the mobile device and the base station between the times i and i−1.

12. A method according to claim 10, further including the steps of, prior to correcting said uncorrected distance estimations:

determining the minimum of said estimated biases within a selected time period; and
updating said estimated biases using said determined minimum bias.

13. A method according to claim 12, further including the steps of, prior to correcting said distance estimations:
determining the absolute minimum bias of all said minimum biases across all time periods; and
updating said estimated biases using the absolute minimum bias.

14. A method according to claim 13, wherein the step of determining the absolute minimum of said estimated biases includes the steps of:
identifying decreases in the estimated bias between successive estimations; and
filtering said decreases to identify decreases which are more than a predetermined threshold.

15. A method according to claim 13, wherein the step of determining the absolute minimum bias further includes the steps of:
calculating a running sum of the differences between minimum bias values in subsequent time periods; and
identifying the absolute minimum bias as the minimum of said running sum.

16. A method according to claim 13, wherein the step of estimating the biases using the minimum and absolute minimum bias calculates the corrected bias estimate b, at time i as:

$$\hat{b}_i^c = \hat{b}_i - \kappa_i + \Sigma_{k=1}^i \delta_k^p - \hat{\theta}_i$$

wherein $\hat{b}_i$ is the bias estimate for the bias at time i, $\kappa_i$ is the minimum value of $\hat{b}_i$ within the selected time period, $\delta_i$ is the first difference of the minimum values $\kappa_i$ ($\delta_i = \kappa_i - \kappa_{i-1}$), $\delta_i^p$ is $\delta_i$ to which a threshold filter has been applied and $\hat{\theta}_i$ is a running estimate of $\theta$, the initial offset in the recursive bias estimation and is calculated as $$\hat{\theta}_i = \min\left(\sum_{k=1}^i \delta_k^p\right).$$

17. A method according to claim 10 wherein the recursive estimation of bias, the determination of the minimum bias and the estimation of the position are performed substantially in real time.

18. A method according to claim 10 wherein the step of correcting includes correcting historic distance estimations to improve the accuracy of previous estimates of the position of the mobile device.

19. A method according to claim 10, further including the step of generating a position track history based on a plurality of estimated positions.

20. A wireless mobile device having a memory and a processor which is arranged to estimate the position of the mobile device, wherein:
the mobile device is capable of receiving ranging packets from a plurality of base stations and estimating the distance of the mobile device from a base station based on the wireless signals received, wherein the ranging packets comprise a hardware timestamp, and
the processor is arranged to:
repeatedly estimate, from said ranging packets, the uncorrected distance of the mobile device from the base station and store said uncorrected distance in said memory;

recursively estimate, from said estimated distances and the changes between differences of said estimated distances, the bias experienced in each of said estimates;

correct uncorrected distance estimations to take account of the estimated bias in each of said uncorrected estimations; and estimate the position of the mobile device from said corrected distance estimations.

21. A mobile device according to claim 20 wherein the processor is further arranged to, prior to correcting said uncorrected distance estimations:

determine the minimum of said estimated biases within a selected time period; and update said estimated biases using said determined minimum bias.

22. A mobile device according to claim 21 wherein the processor is further arranged to, prior to correcting said uncorrected distance estimations:

determine the absolute minimum bias of all said minimum biases across all time periods; and update said estimated biases by the said absolute minimum bias.

23. A mobile device according to claim 22, wherein, when determining the absolute minimum bias, the processor is further arranged to:

calculate a running sum of the differences between minimum bias values in subsequent time periods; and identify the absolute minimum bias as the minimum of said running sum.

24. A mobile device according to claim 20 wherein the recursive estimation of bias and the estimation of the position are performed substantially in real time.

25. A mobile device according to claim 20, wherein the mobile device further comprises a position track history based on a plurality of estimated positions.

26. A positioning system for estimating the position of a mobile device, the system including the mobile device and a plurality of base stations, wherein the mobile device is capable of receiving ranging packets from said plurality of base stations, wherein the ranging packets comprise a hardware timestamp from said plurality of base stations, the system further including a processor which is arranged to estimate the position of the mobile device by:

repeatedly estimating, from said ranging packets, the uncorrected distance of the mobile device from the base station;

recursively estimating, from said estimated distances and the changes between differences of said estimated distances, the bias experienced in each of said estimates;

correcting uncorrected distance estimations to take account of the estimated bias in each of said uncorrected estimations; and estimating the position of the mobile device from said corrected distance estimations.

27. A positioning system according to claim 26, wherein the processor is further arranged to, prior to correcting said uncorrected distance estimations:

determine the minimum of said estimated biases within a selected time period;

update said estimated biases using said determined minimum bias.

28. A positioning system according to claim 26, wherein the processor is further arranged to, prior to correcting said uncorrected distance estimations:

determine the absolute minimum bias of all said minimum biases across all time periods; and update said estimated biases by said absolute minimum bias.

29. A positioning system according to claim 28, wherein, when determining the absolute minimum bias, the processor is further arranged to:

calculate a running sum of the differences between minimum bias values in subsequent time periods; and identify the absolute minimum bias as the minimum of said running sum.

30. A positioning system according to claim 26 wherein the recursive estimation of bias and the estimation of the position are performed substantially in real time.

31. A positioning system according to claim 26 wherein the processor is arranged to correct previous uncorrected distance estimations to improve the accuracy of previous estimates of the position of the mobile device.

32. A positioning system according to claim 26, wherein the system further comprises a position track history based on a plurality of estimated positions.

* * * * *